United States Patent
Hehn et al.

(10) Patent No.: US 11,498,700 B2
(45) Date of Patent: Nov. 15, 2022

(54) CHARGING SYSTEM AND TRAY FOR FLYING MACHINES

(71) Applicant: Verity AG, Zurich (CH)

(72) Inventors: Markus Hehn, Zurich (CH); Nevin McCallum, Zurich (CH); Yuki Machida, Geneva (CH)

(73) Assignee: VERITY AG, Zurich (CH)

( * ) Notice: Subject to any disclaimer, the term of this patent is extended or adjusted under 35 U.S.C. 154(b) by 423 days.

(21) Appl. No.: 16/290,687

(22) Filed: Mar. 1, 2019

(65) Prior Publication Data

US 2019/0270526 A1    Sep. 5, 2019

Related U.S. Application Data

(60) Provisional application No. 62/637,972, filed on Mar. 2, 2018.

(51) Int. Cl.
| | |
|---|---|
| *B64F 1/36* | (2017.01) |
| *B60L 53/35* | (2019.01) |
| *B60L 53/18* | (2019.01) |
| *H02J 7/00* | (2006.01) |
| *B60L 53/30* | (2019.01) |
| *B64C 39/02* | (2006.01) |

(52) U.S. Cl.
CPC ............. *B64F 1/362* (2013.01); *B60L 53/18* (2019.02); *B60L 53/305* (2019.02); *B60L 53/35* (2019.02); *B64C 39/024* (2013.01); *B64C 39/028* (2013.01); *H02J 7/0027* (2013.01); *H02J 7/0042* (2013.01); *H02J 7/0044* (2013.01); *B60L 2200/10* (2013.01)

(58) Field of Classification Search
CPC ............ B60L 53/35–39; B60L 2200/10; H02J 2310/44
See application file for complete search history.

(56) References Cited

U.S. PATENT DOCUMENTS

| | | |
|---|---|---|
| 7,398,946 B1 | 7/2008 | Marshall |
| 7,714,536 B1 | 5/2010 | Silberg et al. |
| 9,143,769 B2 | 9/2015 | Ratti |
| (Continued) | | |

FOREIGN PATENT DOCUMENTS

| | | |
|---|---|---|
| DE | 10 2013 004881 | 9/2014 |
| DE | 10 2015 116118 | 3/2017 |
| WO | WO 2015/195175 | 12/2015 |

OTHER PUBLICATIONS

International Search Report and Written Opinion of the International Searching Authority for Application No. PCT/EP2019/055228, dated Aug. 8, 2019.

*Primary Examiner* — David V Henze-Gongola
(74) *Attorney, Agent, or Firm* — Haley Guiliano LLP

(57) ABSTRACT

Flying machines may be docked during charging or other processes. A tray having multiple docking areas is configured to accommodate flying machines for transport and docking. The docking areas may, but need not, include passageways which may accommodate charging stations. For example, a storage enclosure may be configured to house one or more trays, configured to interface to corresponding charging surfaces. Protective layers and vibration dampening features may be used to soften impacts during storage and transport. A charging station may include electrical terminals, recesses, and locating features for docking a flying machine.

44 Claims, 16 Drawing Sheets

(56) References Cited

U.S. PATENT DOCUMENTS

| | | | |
|---|---|---|---|
| 9,238,414 B2* | 1/2016 | Ryberg | B60L 53/80 |
| 2014/0025229 A1 | 1/2014 | Levien et al. | |
| 2014/0032034 A1 | 1/2014 | Raptopoulos et al. | |
| 2016/0001883 A1* | 1/2016 | Sanz | H02J 7/0044 |
| | | | 244/17.23 |
| 2016/0009413 A1* | 1/2016 | Lee | B64F 1/007 |
| | | | 701/16 |
| 2016/0039541 A1 | 2/2016 | Beardsley et al. | |
| 2017/0050749 A1* | 2/2017 | Pilskalns | B60L 53/36 |
| 2017/0225574 A1 | 8/2017 | Thelen et al. | |
| 2018/0044000 A1* | 2/2018 | Venturelli | B64C 25/34 |
| 2018/0362188 A1* | 12/2018 | Achtelik | B64C 39/024 |

\* cited by examiner

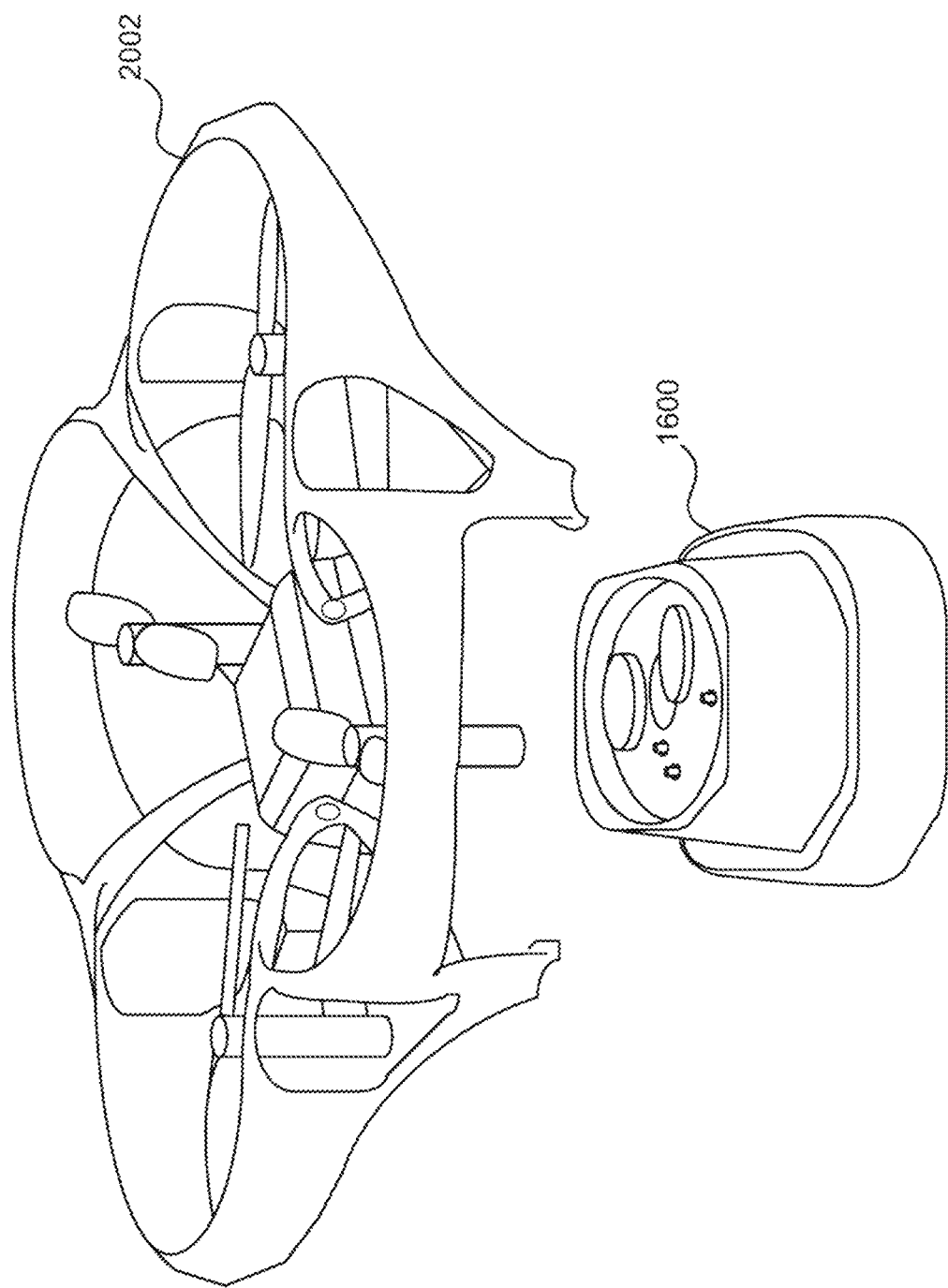

CHARGING SYSTEM AND TRAY FOR FLYING MACHINES

CROSS-REFERENCE TO RELATED APPLICATION

This application claims priority to U.S. Provisional Patent Application No. 62/637,972, filed Mar. 2, 2018, which is hereby incorporated by reference herein in its entirety.

The present disclosure is directed to a charging system, and more particularly, the present disclosure is directed towards a charging station for charging and managing a plurality of flying machines.

BACKGROUND

For a battery-operated flying machine, a separate charger is typically provided and used for charging the battery. The charging process is a manually operated process. For example, a user may need to physically remove the battery from a flying machine, physically connect the battery to a charger, and connect the charger to a power source. Once the battery is charged, the battery needs to be physically disconnected from the charger and reconnected to the flying machine.

Containers such as hard cases and soft packs are available for storing and transporting flying machines. The containers are typically configured to store a single flying machine and may also be configured to store accessories such as extra rotors, an extra battery, a controller for controlling the flying machine, and a charger. In some containers, it may be possible to store two flying machines.

When using multiple flying machines, a user typically uses multiple containers, where each container stores one or two flying machines. The user needs to manually unpack the containers and separately position each of the flying machines for use. When done, the user needs to manually recharge the batteries and manually repack each flying machine into a corresponding container. This is a time-consuming process, particularly when using a large number of flying machines. There is therefore a need for systems and methods to simplify the charging and use of multiple flying machines.

Flying machines, sometimes in large numbers, have been used to create visual displays and performances. For example, flying machines have been programmed to follow particular flight paths in a coordinated light show in the sky. The programming and setup of the flying machines for such performances is a manual and tedious process.

Accordingly, the present disclosure discloses improved systems and methods for charging, storing, and using flying machines.

SUMMARY

In some embodiments, a flying machine charging apparatus includes a tray and a plurality of charging stations. The tray includes a plurality of docking areas arranged on a top surface of the tray in a spatial pattern. For example, the docking areas are configured to provide a dock for corresponding flying machines. Each of the plurality of docking areas is configured to receive a respective one of a plurality of flying machines. Each of the plurality of docking areas include at least one mechanical feature configured to interact with a corresponding portion of a flying machine to maintain the flying machine in the docking areas. Each of the plurality of docking areas also include at least one passageway between the top surface of the tray and an opposite bottom surface of the tray. When the plurality of flying machines are positioned on the plurality of docking areas on the top surface of the tray, and when the bottom surface of the tray is positioned adjacent to the plurality of charging stations such that the spatial patterns of the plurality of docking areas and the plurality of the charging stations are aligned, contact is made between each of the plurality of charging stations and a corresponding one of the plurality of flying machines through a respective at least one passageway.

In some embodiments, each charging station of the plurality of charging stations includes at least one protrusion. When the bottom surface of the tray is moved towards the plurality of docking stations the at least one protrusion of each of the plurality of charging stations passes through the at least one passageway of a respective one of the plurality of docking areas. Each of the at least one protrusion of the plurality of charging stations makes contact with a corresponding one of the plurality of flying machines.

In some embodiments, when the bottom surface of the tray is moved towards the plurality of docking stations, each of the at least one protrusion lifts the corresponding one of the plurality of flying machines off of the top surface of the tray.

In some embodiments, the contact is made using a compression contact or a swipe contact, and when the bottom surface of the tray is positioned adjacent to the plurality of charging stations, the plurality of flying machines are at least partly supported by the tray.

In some embodiments, each charging station of the plurality of charging stations includes at least one magnet configured to apply a force on at least one ferromagnetic component of a corresponding one of the plurality of flying machines to align or couple the flying machine to the charging station. In some embodiments, the positions of the at least one magnet and the at least one ferromagnet component are reversed. In some embodiments, magnets of opposite polarity may be used on the charging stations and flying machines.

In some embodiments, each charging station of the plurality of charging stations includes an inductive charging element.

In some embodiments, each of the plurality of docking areas includes an alignment indicator to facilitate placement of each of the plurality of flying machines on a respective docking area.

In some embodiments, the at least one mechanical feature of each of the plurality of docking areas includes at least three depressions (e.g., three or four depressions) configured to receive corresponding feet of a respective one of the plurality of flying machines.

In some embodiments, for each of the plurality of docking areas, a first depression of the at least three depressions is shaped differently than a second depression of the at least three depressions, and wherein the shapes of the at least three depressions restrict the orientation of a flying machine to a single orientation for placement on the docking area.

In some embodiments, the at least one passageway of each docking area includes at least two passageways, and each of the at least two passageways of each docking area is located in a different one of the at least three depressions. When the plurality of flying machines are positioned on the plurality of docking areas on the top surface of the tray and when the bottom surface of the tray is positioned adjacent to the plurality of docking stations such that the spatial patterns of the plurality of docking areas and the plurality of the charging stations are aligned, contact is made between each of the plurality of charging stations and a corresponding one of the plurality of flying machines through each of the respective at least two passageways.

In some embodiments, the charging apparatus includes a plurality of mechanical keying features configured to facilitate alignment of the tray relative to the plurality of charging stations. In some embodiments, each of the plurality of charging stations includes a plurality of electrical contacts and wherein the plurality of mechanical keying features have sufficient height to prevent the tray from contacting the plurality of electrical contacts for each of the charging stations when the tray is misaligned. In some embodiments, each of the plurality of mechanical keying features is configured to pass through a respective passageway through the tray when the tray is properly aligned with respect to the plurality of charging stations.

In some embodiments, each of the at least one passageway is located in the center of the corresponding docking area.

In some embodiments, each charging station of the plurality of charging stations includes at least two terminals that are configured for making contact with corresponding terminals of a flying machine and wherein the at least two terminals are configured to provide power to the flying machine and data communication with the flying machine.

In some embodiments, the charging apparatus includes a wireless data communication interface configured to provide wireless data communication with the plurality of flying machines.

In some embodiments, each charging station of the plurality of charging stations includes a wireless communication interface configured to provide wireless data communications with a corresponding one of the plurality of flying machines.

In some embodiments, the spatial pattern includes at least three docking areas arranged in a pattern. In some embodiments, the spatial pattern includes at least two rows and at least two columns.

In some embodiments, the tray further includes at least one handle on a side of the tray that can be used to lift the tray.

In some embodiments, the charging apparatus includes an additional plurality of charging stations, and the spatial pattern of the plurality of charging stations extends to the additional plurality of charging stations. Also, the plurality of charging stations and the additional plurality of charging stations comprise a total number of charging stations. Multiple trays are capable of being positioned adjacent to different subsets of the total number of charging stations at the same time.

In some embodiments, the charging apparatus includes a plurality of indicator lights configured to indicate a status of each of the plurality of flying machines when the plurality of flying machines are coupled to the plurality of charging stations.

In some embodiments, the status of each of the plurality of flying machines includes one or more charge status, connectivity status, maintenance status, and correct tray status.

In some embodiments, each indicator light of the plurality of indicator lights is configured to turn a first color when a corresponding one of the plurality of flying machines is charging and second color when the corresponding one of the plurality of flying machines is fully charged.

In some embodiments, each indicator light of the plurality of indicator lights is configured to be off when a corresponding one of the plurality of flying machines is not connected to the network and turn a first color when the corresponding one of the plurality of flying machines is connected to the network.

In some embodiments, the charging apparatus includes a set of indicator lights coupled to the first plurality of charging stations. The set of indicator lights includes a first plurality of indicator lights configured to indicate a level of charge of each of the plurality of flying machines when the plurality of flying machines are coupled to the plurality of charging stations. The set of indicator lights also includes a second plurality of indicator lights configured to indicate a connectivity status of each of the plurality of flying machines to a network when the plurality of flying machines are coupled to the plurality of charging stations.

In some embodiments, the charging apparatus includes a protective layer configured to be positioned above or below the plurality of flying machines when the plurality of flying machines are positioned on the plurality of docking areas.

In some embodiments, the charging apparatus includes a bottom protective layer and a top protective layer. The bottom protective layer is configured to be positioned between the tray and the plurality of flying machines. The top protective layer is configured to be positioned over the bottom protective layer when the plurality of flying machines are positioned on the plurality of docking areas to protect each of the plurality of flying machines in a void between the bottom protective layer and the top protective layer.

In some embodiments, the charging apparatus includes a protective layer configured to protect the plurality of flying machines when the plurality of flying machines are positioned on the plurality of docking areas. In some embodiments, the charging apparatus includes a storage mechanism configured to store the protective layer when the protected layer is not in use.

In some embodiments, each of the plurality of docking areas includes at least one guide structure configured to assist in launching a corresponding flying machine from the docking area without interfering with adjacent flying machines.

In some embodiments, each of the plurality of docking areas includes a self-locating feature configured to assist in aligning a corresponding flying machine with the at least one mechanical feature of the docking area.

In some embodiments, the at least one mechanical feature of each of the plurality of docking areas is configured to interact with the corresponding portion of the flying machine to maintain the flying machine in a particular position in the docking area.

The at least one mechanical feature of each of the plurality of docking areas is configured to maintain the flying machine in any orientation. Also, the plurality of charging stations are each configured to charge a corresponding flying machine maintained in the particular position in any orientation.

In some embodiments, the at least one mechanical feature of each of the plurality of docking areas is configured to interact with the corresponding portion of the flying machine to maintain the flying machine in any one of a discrete number of orientations less than ten. The plurality of charging stations are each configured to charge a corresponding flying machine maintained in any one of the discrete number of orientations.

In some embodiments, the charging apparatus includes a retractable drawer that includes the plurality of charging stations. In some embodiments, the charging apparatus includes a storage container that includes the retractable drawer and an additional retractable drawer that includes a plurality of charging stations.

In some embodiments, the charging apparatus includes a storage container that includes the plurality of charging stations. The storage container includes an inner frame, an outer frame, and at least one shock absorber between the inner frame and the outer frame.

In some embodiments, a method of charging a plurality of flying machines includes placing a plurality of flying machines on a plurality of docking areas of a tray that is positioned at a first location. For example, the plurality of docking areas are arranged on a top surface of the tray in a spatial pattern. The method also includes lifting the tray with the plurality of flying machines from the first location. The method also includes placing the tray with the plurality of flying machines at a second location adjacent to a plurality of charging stations arranged in the spatial pattern, thereby coupling the plurality of charging stations to the plurality of flying machines. The spatial patterns of the plurality of docking areas and the plurality of charging stations are aligned when the tray is at the second location. The method also includes charging the plurality of flying machines using the plurality of charging stations while the tray is at the second location.

In some embodiments, the method includes lifting the tray with the plurality of flying machines from the second location, thereby decoupling the plurality of the charging stations from the plurality of flying machines. The method also includes placing the tray at a third location. The method also includes launching at least one of the plurality of flying machines from the tray while the tray is positioned at the third location.

In some embodiments, a charging station for a flying machine includes a first recess configured to receive a surface portion of the flying machine, a second recess within the first recess configured to receive a protrusion from the surface portion of the flying machine, at least one locator feature protruding from the recess, at least one magnet arranged under the recess, and at least two electrical terminals that extend above the recess.

In some embodiments, the protrusion is a light source.

In some embodiments, the charging station includes an electrical connector configured to receive AC power from a power source.

In some embodiments, the at least two electrical terminals are configured to provide DC charging.

In some embodiments, the at least two electrical terminals include at least three electrical terminals. Two of the at least three electrical terminals are configured to provide DC charging and at least one of the at least three electrical terminals is configured to provide communication with the flying machine.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 20 shows a perspective view from the top of an illustrative flying machine and the illustrative charging station of FIG. 16, in accordance with some embodiments of the present disclosure.

DETAILED DESCRIPTION

A tray is provided in accordance with the present disclosure having multiple docking areas configured to accommodate flying machines. The tray can be used for transport and storage of flying machines. The docking areas of the tray may include passageways which accommodate charging stations. In some embodiments, a storage enclosure may be configured to house one or more trays, configured to interface to corresponding charging surfaces having charging stations. Protective layers and vibration dampening features may be used to soften impacts during storage and transport. Each charging station may include electrical terminals, recesses, and locating features for docking a flying machine. Docking, as used herein, refers to the act of aligning and engaging a flying machine to a corresponding docking area of a tray, a corresponding charging station, or both.

The tray can also be used to facilitate the operation of flying machines. For example, when the flying machines are ready to operate, the tray can be moved to an appropriate launch location and the flying machines can be launched directly from the tray. This eliminates the need to manually place each of multiple flying machines in separate launch locations. In addition, when the flying machines have landed, the flying machines can be loaded onto appropriate docking areas of the tray and carried to an appropriate storage or charging location. In some embodiments, two, four, six, eight, ten, twelve, or more flying machines can be positioned on each tray.

Figure 1:
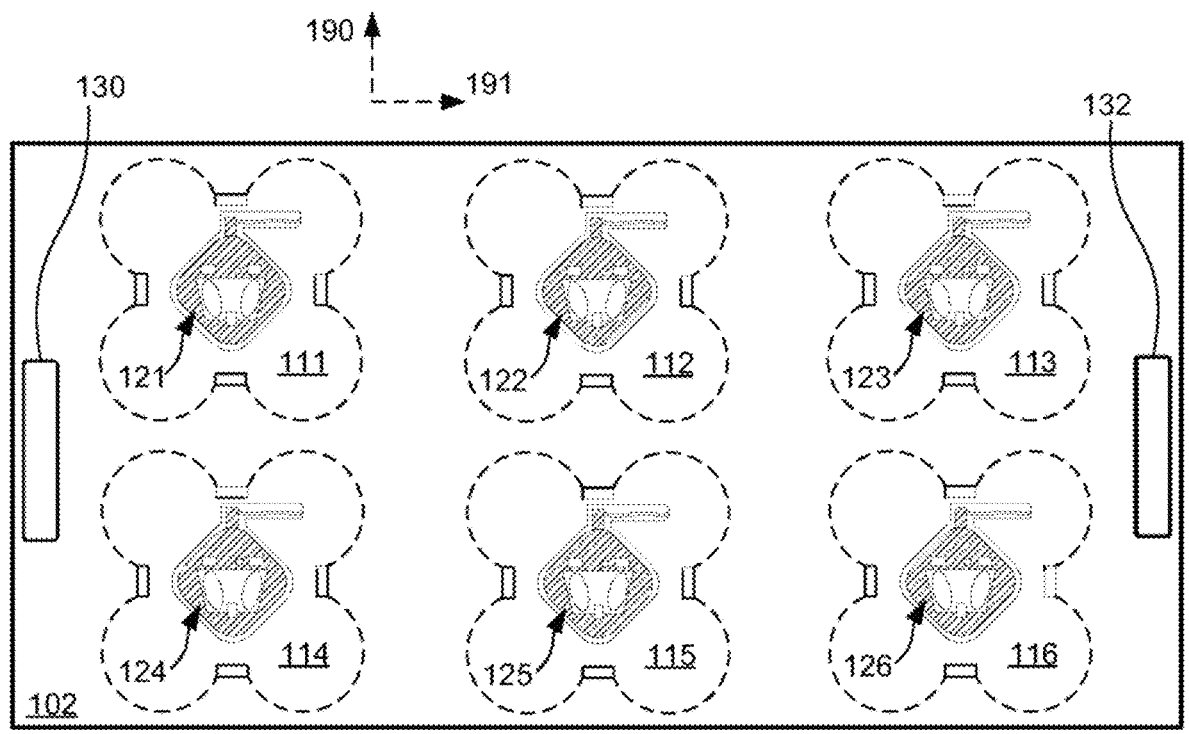
FIG. 1 shows a top view of an illustrative tray with multiple docking areas, and charging stations, in accordance with some embodiments of the present disclosure.

FIG. 1 shows a top view of illustrative tray 102 with docking areas 111-116, and charging stations 121-126, in accordance with some embodiments of the present disclosure. Tray 102 includes handles 130 and 132, which may be used to transport tray 102, carry tray 102, lift tray 102, pull tray 102, or otherwise apply manual force to tray 102.

Each of docking areas 111-116 are configured to interface with a flying machine. For example, six flying machines may be docked on tray 102. In some embodiments, a docking area is configured to dock a particular flying machine. For example, docking area 112 may be configured to interface to a particular flying machine (e.g., having a particular serial number). In some embodiments, each docking area may accommodate any suitable flying machine. For example, in some embodiments, six flying machines may dock at docking areas 111-116, each flying machine docking at any of areas 111-116 (e.g., in any suitable order, or randomly). Docking areas 111-116 may each include an alignment indicator to facilitate placement of a corresponding flying machine. For example, each docking area shown in FIG. 1 includes a dashed line. The dashed line is a visual indicator (e.g., printed or marked on tray 102) to assist an operator in placing the flying machine in the correct position and orientation. As illustrated, the dashed line has the shape of the perimeter of a quadcopter. It will be understood that different and/or additional indicators can be used to indicate the locations and orientations of the flying machine for docking.

Charging stations 121-126 correspond to respective docking areas 111-116. For example, docking areas 111-116 are arranged in a spatial pattern (i.e., a 2×3 array as shown in FIG. 1), and charging stations 121-126 are arranged in a corresponding pattern. Charging stations 121-126 are configured to provide charge (i.e., electrical power) to docked flying machines via two or more electrical terminals (e.g., when a tray of flying machines is positioned on charging stations 121-126). In some embodiments, charging stations 121-126 are configured to provide communication with docked flying machines, via two of more electrical terminals (e.g., which may be the same or different than the electrical terminals used for charging). In some embodiments, charging stations 121-126 take as input DC power and provide as output DC power. In some such embodiments, the input DC power and output DC power are at substantially the same voltage. In some embodiments, the input DC power and output DC power are at different voltages. For example, in some embodiments, the voltage corresponding to the input is higher than the voltage corresponding to the output. In some embodiments, charging stations 121-126 may take as input AC power (e.g., from an outlet or other grid-connected interface), and provide as output DC power (e.g., to charge a DC source such as a battery). In some embodiments, charging stations 121-126 may each be coupled to a central control system. In some embodiments, charging stations 121-126 may be connected via a network (e.g., as nodes in a Modbus or CAN bus arrangement, or may each have an IP address on a local area network). Charging stations 121-126 are each configured to interface to a corresponding flying machine docked at respective docking areas 111-116. In some embodiments, charging stations 121-126 are each configured to support the full weight of a docked corresponding flying machine. For example, electrical contact between electrical terminals of a flying machine and corresponding electrical terminals of a charging station may be maintained by the normal force of the flying machine resting on the charging station due to gravity. In some embodiments, charging stations 121-126 are configured to electrically couple to respective docked flying machines without supporting all or some of the weight of the flying machines. For example, a flying machine may be docked to a docking area of tray 102, which supports the full weight of the flying machine, and a corresponding charging station may electrically couple to the flying machine (e.g., via contact between corresponding electrical terminals, which may be maintained via spring terminals).

It will be understood that tray 102 is positioned adjacent to charging stations 121-126 in FIG. 1. This can be achieved by positioning tray 102 above charging stations 121-126 with docking areas 111-116 aligned with charging stations 121-126 and lowering tray 102 until contact is made between tray 102 and corresponding portions of charging stations 121-126. In some embodiments, tray 102 is lowered until it makes contact with one or more supports separate from charging stations 121-126. When the flying machines are ready to be operated, tray 102 can be lifted of off charging stations 121-126 (e.g., via handles 130 and 132). In some embodiments, if the flying machines were resting on charging stations 121-126, tray 102 will make contact with the flying machines and lift the flying machines off the charging stations while maintaining the flying machines in their respective docking areas of the tray.

In some embodiments, charging stations 121-126 are mounted in a storage container such as a 19" rack mount enclosure, or other enclosure. For example, in some embodiments, charging stations 121-126 are configured to slide in and out of a 19" rack mount on sliding rails. In a further example, in some embodiments, charging stations 121-126 are configured to rest on a sliding shelf in a 19" rack mount enclosure. Tray 102 is configured to be moved by a user, via handles 130 and 132. For example, a user may remove tray 102 from charging stations 121-126 and carry tray 102 out in the field, near a launch site, which may be more convenient than carrying six individual carrying cases. When finished, tray 102 may be returned with the flying machines to the storage container for charging, storage, and/or transport. It will be understood that in some embodiments, tray 102 can be stored in a storage container (e.g., a rack) that does not include charging stations.

In some embodiments, each of docking areas 111-116 includes at least one guide structure configured to assist in launching a corresponding flying machine from the docking area without interfering with adjacent flying machines. For example, walls, shrouds, or other suitable partitions, may be implemented to limit lateral movement of a flying machine during the initial portion of take-off to limit or prevent the flying machine from making contact with adjacent flying machines. As another example, walls, shrouds, or other suitable partitions, may be implemented to prevent the downwash of a flying machine taking off from affecting adjacent flying machines. In some embodiments, the at least one guide structure comprises a grid of walls (e.g., whose height is equal to or less than the height of the flying machines) that surround each docking area. In some embodiments, the at least one guide structure comprises shrouds that surround one or more recesses in each docking area to limit lateral movement of one or more legs of a corresponding flying machine. In some embodiments, the at least one guide structure comprises a protrusion at each docking station configured to pass through a portion of a flying machine that constrains lateral movement during takeoff.

In some embodiments, each of the plurality of docking areas includes a self-locating feature configured to assist in aligning a corresponding flying machine with the at least one mechanical feature of the docking area. For example, recesses 171-174 may include sloped entries, thus guiding a docking flying machine into a docked configuration (e.g., under the influence of gravity and/or agitation). In some embodiments, a self-locating feature and a guide structure are combined as a single, or integrated, structure. For example, a guide structure may include a shroud that directs air flow from a flying machine away from other flying machines, and the shroud may also act as a guide to aid in the alignment of the flying machine with a corresponding docking area.

Figure 2:
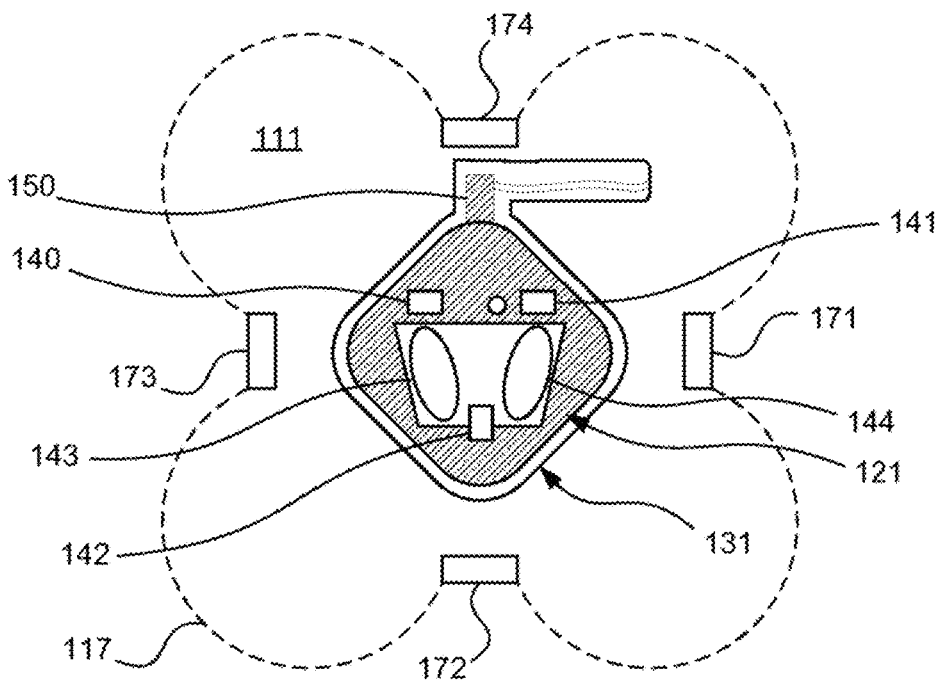
FIG. 2 shows a top view of an illustrative docking area of FIG. 1 with a passageway, and the corresponding charging station of FIG. 1, in accordance with some embodiments of the present disclosure.

FIG. 2 shows a top view of illustrative docking area 111 of FIG. 1 with passageway 131, and corresponding charging station 121 of FIG. 1, in accordance with some embodiments of the present disclosure. Recesses 171-174 are configured to interface with feet of a corresponding flying machine. In some embodiments, four feet of a flying machine fit into any of recesses 171-174 when docked (e.g., when the weight of the flying machine is supported by tray 102). In some embodiments, four feet of a flying machine line up with, but do not fit into, recesses 171-174 when docked (e.g., when the weight of the flying machine is supported by charging station 121). Note that axes 190 and 191 define the lateral plane (e.g., in the plane of tray 102), while direction "up" and "down" are defined as normal to axes 190 and 191. For example, typically a flying machine lifting off of tray 102 may travel in the "up" direction to clear tray 102. It will be understood that recesses 171-174 act as mechanical features that interact with a corresponding portion of the flying machine (e.g., the feet) to maintain the flying machine in the docking area. For example, when the flying machine is resting in recesses 171-174, recesses 171-174 will provide resistance to lateral movement of the flying machine, thereby maintaining the flying machine in docking area 111. It will also be understood that one of recesses 171-174 may be shaped differently than another of the recesses. By using a differently shaped recess and a corresponding differently shaped foot of a flying machine, the orientation of the flying machine can be restricted for placement on the docking area. For example, if the recesses and feet are all the same shape, then the flying machine can be positioned in any one of four orientations. By using a differently shaped recess and foot (e.g., one recess and corresponding foot being wider or longer than the others), the flying machine can be restricted for placement in a single orientation. In some embodiments, restricting the orientation of the flying machine on tray 102 ensures proper orientation between the flying machine and a corresponding charging station.

Charging station 121 passes through passageway 131 of tray 102 when tray 102 is positioned adjacent to the charging station. Charging station 121 includes electrical terminals 140, 141, and 142, which are, in some embodiments, configured to contact corresponding electrical terminals of a flying machine docked at docking area 111. For example, electrical terminals 140 and 141 may be configured to provide charging to the flying machine, while electrical terminal 142 may be configured to provide communication with the docked flying machine (e.g., with communication signals relative to a common ground such as one of electrical terminals 140 and 141). Features 143 and 144 may be configured to engage with corresponding features of the docked flying machine to aid in maintaining the docked configuration. For example, features 143 and 144 may be protrusions, configured to fit into corresponding recesses in the bottom of the flying machine when docked (e.g., to prevent lateral motion in the plane defined by axes 190 and 191). In some embodiments, features 143 and 144 need not be included (e.g., other features on the tray, such as recesses 171-174, may be sufficient to maintain the docked configuration). Cable 150, including a corresponding electrical connector, is connected to charging station 121 to provide power, wired communication (e.g., to another subsystem, or a control system), or both. As shown in FIG. 2, passageway 131 is configured to clear charging station 121 and also cable 150.

Charging station 121 as shown in FIG. 2 is shaped to mate with a flying machine in a single orientation (e.g., via features 143 and 144). It will be understood that this is merely illustrative and that the charging stations of the present disclosure can be shaped and structured to mate with a flying machine in multiple orientations or any orientation.

In some embodiments, a tray need not include passageways. For example, a docking area of a tray may include electrical contacts, which in turn are electrically connected to electrical contacts on the opposite side of the tray. To illustrate, a flying machine may dock to a docking area having electrical contacts. On the underside of the tray, there may also be electrical contacts which interface to a charging station as well as the electrical contacts of the docking area. Accordingly, a flying machine may be coupled to a charging station via a circuit included in the tray. In some embodiments, a single charging station interfaces to a tray (e.g., on the underside), and be coupled to multiple, or all, docking areas of a tray via conductive paths within the tray (e.g., which may include a printed circuit or wire runs, or both). In some embodiments, each docking area is coupled to corresponding electrical contacts which interface with a respective charging station. In some embodiments, each docking area includes electrical contacts for communication and charging, which may be coupled to respective charging stations, communications ports, or both. In some embodiments, each docking area includes electrical contacts for communication and charging, which may be coupled to a single, central charging station, communications port, or both. For example, in some embodiments, each docking area includes electrical contacts that form nodes of a two-wire bus (e.g., a CAN bus, serial Modbus, or other bus). In some embodiments, an arrangement of electrical contact of a docking area is repeated on the other side of the tray. In some embodiments, an arrangement of electrical contacts of a docking area is different from an arrangement of electrical contacts configured to interface with a charging station. In some embodiments, a tray includes a plurality of docking areas configured to interface with a corresponding plurality of flying machines, and the tray includes a plurality of corresponding areas (e.g., on the underside of the tray) configured to interface with a corresponding plurality of charging stations. In some embodiments, each docking area includes first electrical contacts for docking a flying machine and second electrical contacts for interfacing to a charging station, wherein the second electrical contacts are coupled to respective first electrical contacts.

Figure 3A:
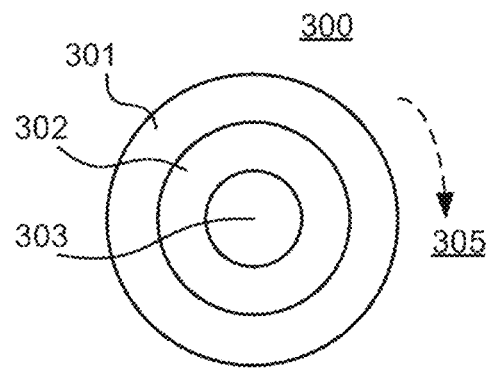
FIG. 3A shows a top view of an illustrative terminal pattern, in accordance with some embodiments of the present disclosure.

FIG. 3A shows a top view of illustrative terminal pattern 300, in accordance with some embodiments of the present disclosure. Terminal pattern 300 includes terminals 301, 302, and 313 in a concentric arrangement. In some embodiments, terminal pattern 300 can be used on the charging stations and corresponding terminals can be located on the flying machines spaced apart to make contact with respective terminals of terminal pattern 300. In some embodiments, terminal pattern 300 can be used on the flying machines and corresponding terminals can be located on the charging stations to make contact with respective terminals of terminal pattern 300. For example, the positions of terminals 140-142 of FIG. 2 can be rearranged (e.g., one centered and the other two spaced away from the center at different distances) to make contact with terminal pattern 300. The concentric arrangement of FIG. 3A allows rotational flexibility in a flying machine's orientation when docked with a corresponding charging station, but may require a relatively precise position alignment. In some embodiments, terminal pattern 300 allows a flying machine to dock at any angle in the azimuthal direction, which is shown in FIG. 3A by directional arrow 305. In such embodiments, each docking area of the tray may include at least one mechanical feature to maintain the position, but not orientation, of a corresponding flying machine. For example, a circular recess (e.g., a circular recessed groove) can be used for each docking area. The feet of the flying machine may be arranged to fall on a circle having the same diameter or a smaller diameter as the circular recess. When a flying machine is positioned on such a docking area, the feet enter the circular recess. The circular recess accordingly maintains the lateral position of the flying machine while allowing the flying machine to be in any orientation. In some such embodiments, features 143 and 144 of docking station 121 provide a precise relative location between the charging station and the flying machine, which may include a precise position, orientation, or both. It will be understood that while terminal pattern 300 includes three terminals, in some embodiments terminal pattern 300 includes two terminals (e.g., when only charging is provided or when charging and communication use the same two channels). It will also be understood that in some embodiments, terminal pattern 300 includes four or more terminals (e.g., when charging and communication use separate terminals)

Figure 3B:
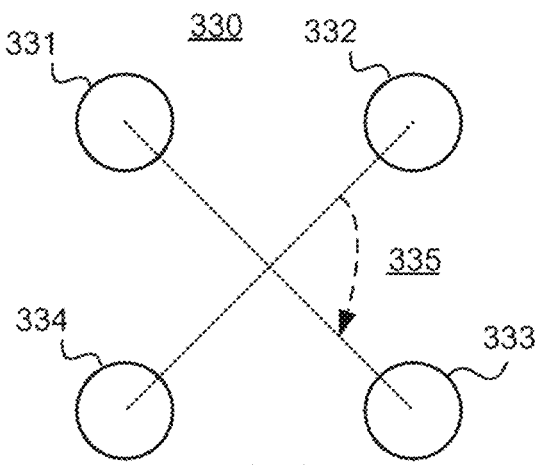
FIG. 3B shows a top view of an illustrative terminal pattern, in accordance with some embodiments of the present disclosure.

FIG. 3B shows a top view of illustrative terminal pattern 330, in accordance with some embodiments of the present disclosure. Terminal pattern 330 includes terminals 331, 332, 333, and 334 arranged at 90° intervals in the azimuthal direction, which is shown in FIG. 3B by directional arrow 335. In some embodiments, terminals 331-334 are located on a charging station and are configurable based on the orientation of a docked flying machine. For example, a flying machine may include two, three, or four corresponding terminals, which when docked, contact corresponding ones of terminals 331-334. It is noted that there are four possible docking orientations in this example. Accordingly, in this illustrative example, depending on which of the terminals of the charging station make contact with the terminals of the flying machine, the appropriate terminals are configured to provide charging (e.g., a positive or negative DC-bus terminal), communication (e.g., a data terminal), or both (e.g., a common chassis ground terminal). In such embodiments, each docking area of the tray may include at least one mechanical feature such that a corresponding flying machine can dock at any suitable azimuthal angle consistent with the 90° clocking. For example, recesses 171-174 of FIG. 2 are illustrative mechanical features that enable a flying machine to dock in any one of four orientations.

In some embodiments, terminals 331-334 are located on the flying machines and the charging stations may include two, three, or four corresponding terminals positioned consistent with the pattern of terminals 331-334. Depending on which of the terminals of the flying machine make contact with the terminals of the charging station, the appropriate terminals of the flying machine are configured (e.g., using one or more switches) to provide charging, communication, or both.

It will be understood that any suitable number of terminals may be included in a terminal pattern. For example, if a terminal pattern includes N terminals (e.g., where N is any suitable integer such as 2, 3, 4, 5, 6, 7, 8, etc.), the terminals may be spaced at 360/N° apart around a center point (e.g., when N=4, the terminals may be spaced 90° as shown in FIG. 3B). In a further example, N terminals may be arranged in any suitable terminal pattern having rotational symmetry (e.g., pairs of two terminals may be repeated, spaced by a suitable angle).

Figure 3C:
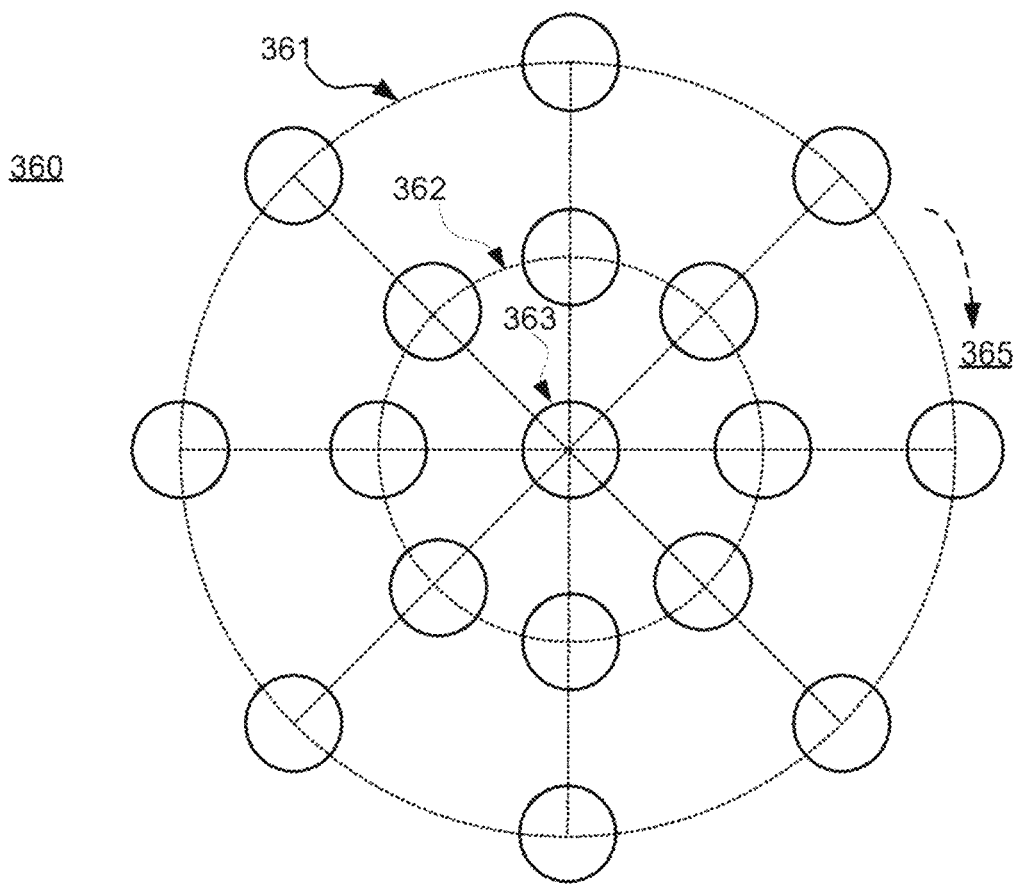
FIG. 3C shows a top view of an illustrative terminal pattern, in accordance with some embodiments of the present disclosure.

FIG. 3C shows a top view of illustrative terminal pattern 360, in accordance with some embodiments of the present disclosure. Terminal pattern 360 includes terminals arranged at 45° intervals in the azimuthal direction, which is shown in FIG. 3C by directional arrow 365. There are eight terminals spread evenly around circle 361, eight terminals spread evenly around circle 362, and a single terminal at center 363. In some embodiments, the terminals of terminal pattern 360 may be configurable based on the orientation of a docked flying machine. For example, a flying machine may include three corresponding terminals, which, when docked, contact one terminal on circle 361, one terminal on circle 362, and the terminal at center 363 of terminal pattern 360 (e.g., there are eight possible docking orientations in this example). In a further example, each terminal on circle 361 may be coupled together, performing an identical function (e.g., having the same charging polarity, or data signal). Similarly, each terminal on circle 362 may be coupled together, configured to perform an identical function. Any suitable configuration and number of terminals, having any suitable symmetry, and having any suitable function, may be included in a terminal pattern, at a docking area or a flying machine, in accordance with the present disclosure. For example, a terminal pattern may include M circles (e.g., where M is a suitable integer), each having $N_M$ corresponding terminals (e.g., wherein $N_M$ is a suitable integer), having any suitable symmetry, or no symmetry (e.g., a single terminal pattern, but a plurality of terminals). For example, referencing terminal pattern 360, terminals may be spaced by any suitable angle (e.g., 30° if circles include 12 terminals rather than 8 terminals).

In view of the foregoing, various terminal patterns may be used in accordance with the present disclosure. For example, any one of the terminal patterns of FIGS. 3A-C may be used on charging stations 121-126 of FIGS. 1-2. As another example, any one of the terminal patterns of FIGS. 3A-C may be used on the flying machines of the present disclosure.

It will be understood that the configuration of the docking areas on tray 102 is merely illustrative and any suitable modifications can be made in accordance with the present disclosure. In some embodiments, each docking area of tray 102 includes a single passageway that is not centered. In some embodiments, each docking area of tray 102 includes at least two passageways, which may be centered or not centered. For example, instead of a single passageway being generally centered in each docking area, separate passageways may be located in at least two of the recesses for each docking area. For example, each docking area recess may include a passageway smaller than the size of the recess. In this example, the charging stations may include protrusions sized to pass through the passageways in the recesses. Any suitable configuration of one or more passageways may be used in accordance with the present disclosure.

Referring to FIG. 2, recesses 171-174 may each include a passageway and the charging station may include four protrusions configured to pass through respective passageways in recesses 171-174. In such embodiments, at least two of the protrusions include electrical terminals and the bottom of the feet of at least two legs of the flying machine also include corresponding electrical terminals. In some embodiments, the bottom of the feet may each include a recess and the protrusions may be shaped to enter the recesses. For example, when tray 102 is lowered down onto a charging station, the protrusions may pass through respective passageways, enter the recesses on the bottom of the feet of the flying machine, and lift the flying machine off of the tray, thereby making electrical contact between the charging station and flying machine. In some embodiments, the flying machine is configured with three, four, five, or more legs and the charging station may include a corresponding number of three, four, five, or more protrusions.

Figure 4:
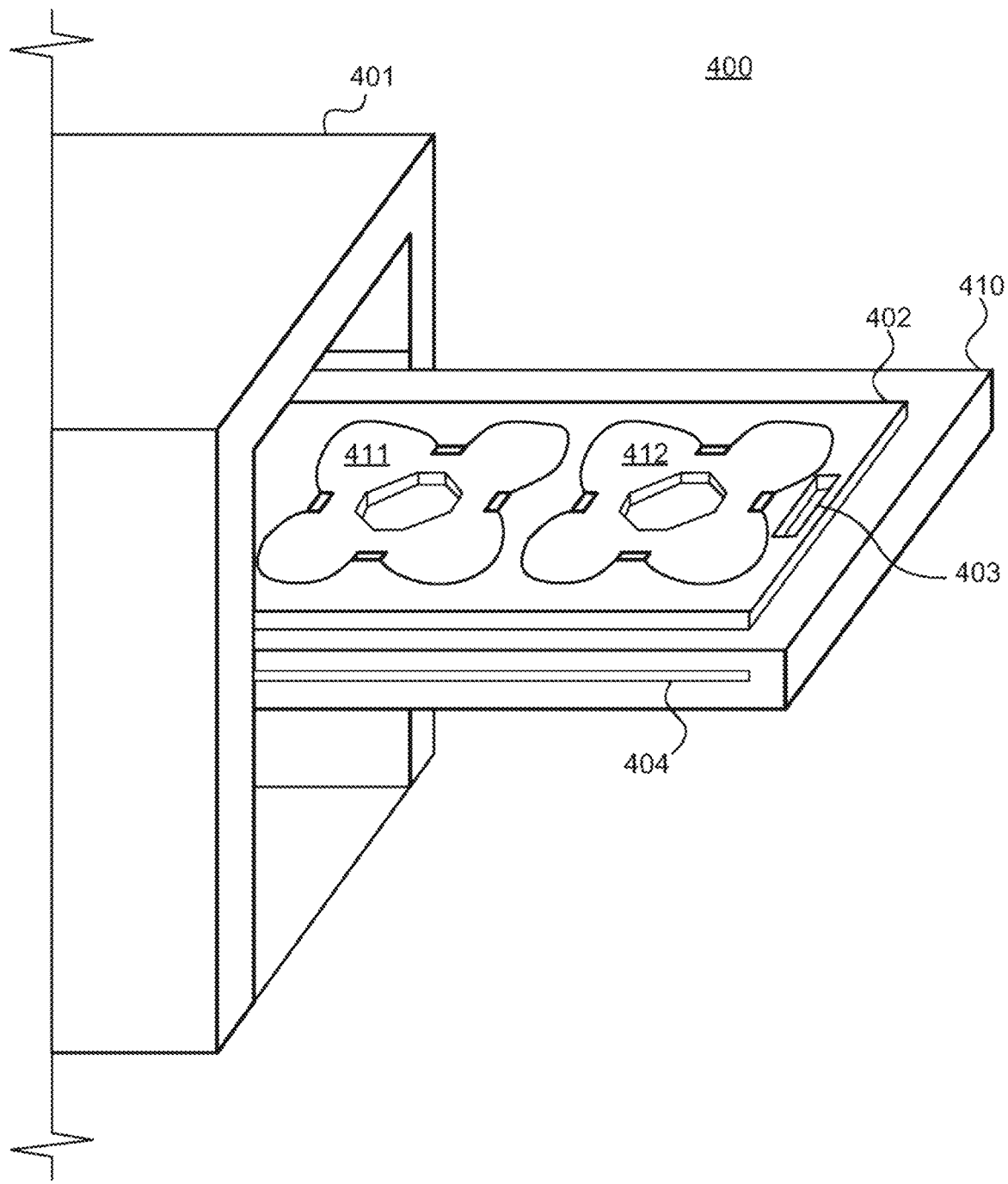
FIG. 4 shows a perspective view of an illustrative tray mounted in a rack on a sliding shelf, in accordance with some embodiments of the present disclosure.

FIG. 4 shows a perspective view of illustrative tray 402 mounted in storage container 401 on sliding shelf 410, in accordance with some embodiments of the present disclosure. Sliding shelf 410 includes slide hardware 404, which may include bearings, guide pins, or other suitable hardware. In some embodiments, tray 402 may correspond to tray 102 of FIG. 1. Tray 402 includes docking areas 411 and 412 configured to dock two corresponding flying machines. In some embodiments, tray 402 is removable from sliding shelf 410 using, for example, handle 403 and a corresponding handle (not shown) on the opposite end of tray 402. In some embodiments, flying machines are stored on tray 402, along with additional flying machines mounted on additional trays, in storage container 401. In some embodiments, flying machines are charged while docked on tray 402 with corresponding charging stations, along with additional flying machines docked on additional trays having corresponding charging stations, in storage container 401. Although charging stations are not shown in FIG. 4 for simplicity, charging stations may be included, corresponding to docking areas 411 and 412. For example, charging stations each corresponding to charging station 121 of FIGS. 1-2 may be included to interface with docking areas 411 and 412 of tray 402. Although only two docking areas are shown in FIG. 4 (i.e., docking areas 411 and 412), any suitable number of docking areas, positioned in any suitable arrangement, may be included on tray 402.

In some embodiments, indicator lights are included to provide a status indication to a user. In some embodiments, for example, one or more indicator lights are included as part of each charging station, indicating a charging station status. In some embodiments, for example, an indicator light module may be included, which includes a plurality of indicator lights configured to indicate a status for each charging station, a group of charging stations, or an entirety of charging stations. For example, the indicator lights may indicate a status of each of multiple flying machines when the multiple flying machines are coupled to the charging stations. In some embodiments, the status of each of the multiple flying machines includes one or more of charge status (e.g., fully charged), connectivity status, maintenance status (e.g., a mechanical or software error), and correct tray status (e.g., when multiple trays are used). In some embodiments, each indicator light is configured to turn a first color when a corresponding flying machine is charging and second color when the corresponding flying machines is fully charged. In some embodiments, each indicator light is configured to be off when a corresponding flying machines is not connected to the network and turn a first color when the corresponding flying machines is connected to the network. In some embodiments, each indicator light is configured to flash at different frequencies or patterns to indicate different statuses. For example, each indicator light may be off when a corresponding flying machine is not connected, blinking when the corresponding flying machine is charging, and on when the corresponding flying machine is fully charged. In some embodiments, a set of indicator lights are used. The set of indicator lights may include a first plurality of indicator lights configured to indicate a level of charge of each of the flying machines when the flying machines are coupled to the charging stations. The set of indicator lights also includes a second plurality of indicator lights configured to indicate a connectivity status of each of the flying machines to a network when the flying machines are coupled to the charging stations.

Figure 5:
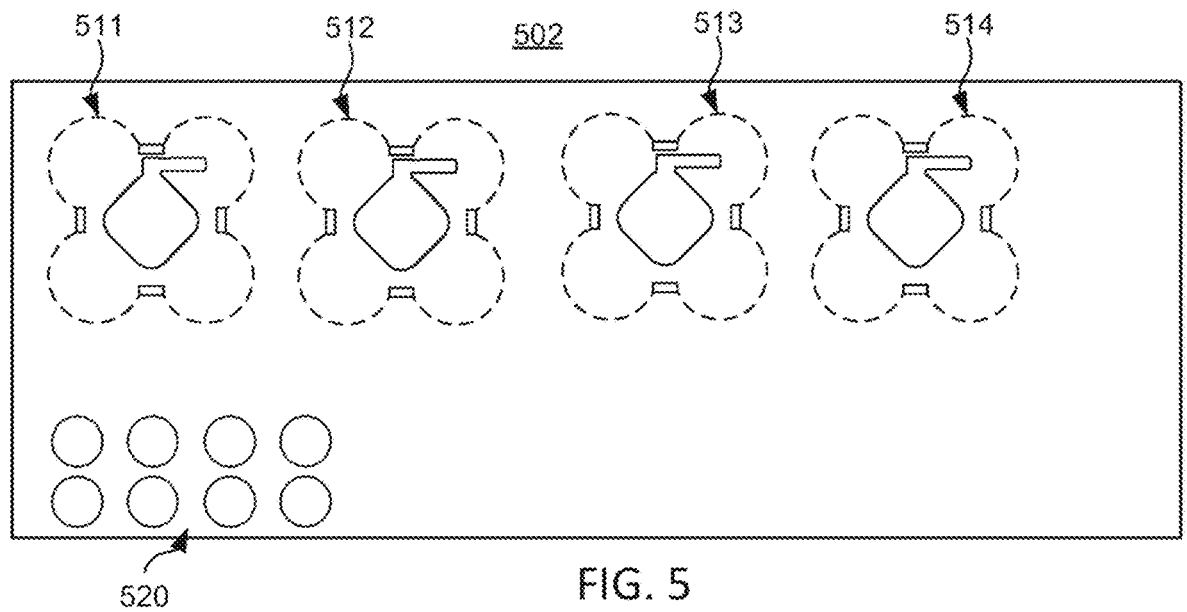
FIG. 5 shows a top view of an illustrative tray with docking areas, in accordance with some embodiments of the present disclosure.

In some embodiments, the tray includes one or more of the indicator lights, which may be powered and controlled via a plug or cable that connects to the tray. In some embodiments, the tray may include cutouts, recesses, or otherwise openings, so that indicator lights are visible when the tray is placed on a charging surface. FIG. 5 shows a top view of illustrative tray 502 with docking areas 511-514, in accordance with some embodiments of the present disclosure. Tray 502 also includes indicator light area 520, which includes holes allowing lights to be visible from underneath. For example, in some embodiments, a charging surface may include charging stations, as well as indicator lights which may correspond to the holes of indicator light area 520. As shown, tray 502 includes four columns of two holes where each column corresponds to a different docking area. In some embodiments, two indicator lights (e.g., a first indicating a level of charge and the second indicating connectivity status) are visible through the holes in each column. While the indicator lights are arranged together in FIG. 5, in some embodiments the indicator lights and corresponding holes may be located near each docking area. It will be understood that any suitable number of docking areas and corresponding holes or indicator lights can be used on a tray.

Figure 6:
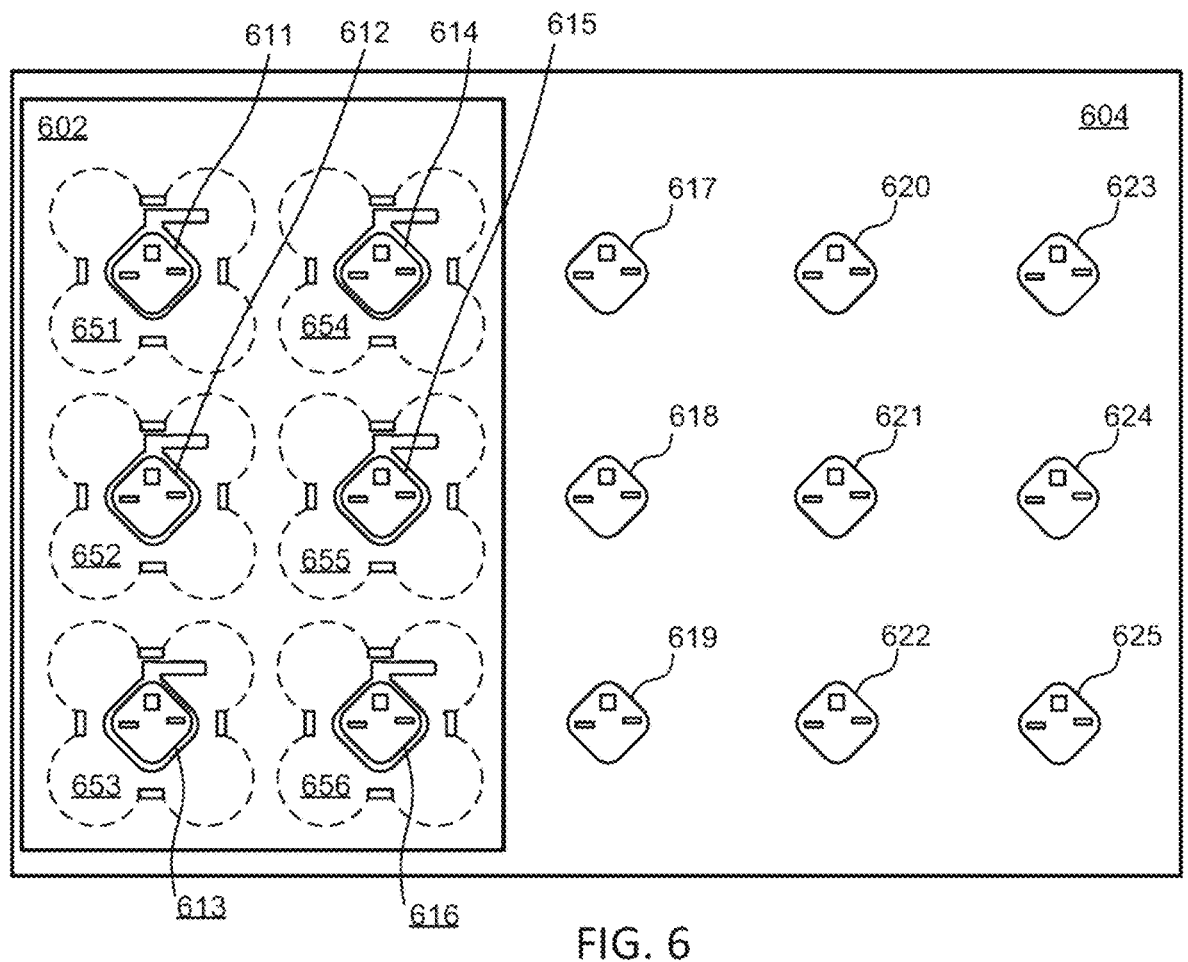
FIG. 6 shows a top view of illustrative charging stations, in accordance with some embodiments of the present disclosure.

A tray in accordance with the present disclosure may include any suitable number of docking areas, which may be, but need not be, the same as a number of charging stations arranged on a charging surface. In some embodiments, for example, a charging surface includes a plurality charging stations and one or more trays each include a lesser number of docking areas. In some such embodiments, a tray may be positioned to align with one or more subsets of charging stations on a charging surface. Further, in some such embodiments, more than one tray may be positioned on respective subsets of charging stations (e.g., two or more trays may be arranged on a charging surface at the same time). FIG. 6 shows a top view of illustrative charging stations 611-625, in accordance with some embodiments of the present disclosure. Charging stations 611-625 are arranged illustratively in a three-by-five array on charging surface 604. Tray 602 includes six docking areas 651-656, arranged in a spatial pattern (e.g., a three-by-two array). Docking areas 651-656 are aligned with charging stations 611-616 for illustration, but may be aligned with any suitable three-by-two grouping of charging stations (e.g., charging stations 620-625). Accordingly, a tray need not be the same size as a charging surface, as long as the tray interfaces with all, or a subset of, charging stations of the charging surface. In some embodiments, for example, a tray may include more docking areas than a corresponding charging surface. In some such embodiments, one or more docking areas will not align with a charging station of the charging surface. Charging stations 611-625 are shown in FIG. 6 without wiring or optional features for clarity. It will be understood that a charging station may include any suitable component and features, in accordance with the present disclosure.

For example, docking areas 651-656 are arranged in a spatial pattern, and charging stations 611-625 are also arranged in the spatial pattern, which is repeated, or extends, over a greater area. Accordingly, tray 602 may be placed onto charging surface 604 with the docking areas aligned with a subset of the charging stations (e.g., charging stations 611-616), as shown in FIG. 6.

In some embodiments, a flying machine charging apparatus includes tray 602, which includes docking areas 651-656 arranged on a top surface of tray 602 in a spatial pattern (e.g., a three-by-two array). Each of docking areas 651-656 is configured to receive a respective flying machine (e.g., of a plurality of flying machines). Each of docking areas 651-656 includes at least one mechanical feature configured to interact with a corresponding portion of a flying machine to maintain the flying machine in the docking area. Tray 602 includes passageways between the top surface of the tray and an opposite bottom surface of the tray (e.g., to accommodate charging stations). Charging stations 611-616 are arranged in the same spatial pattern. When flying machines are positioned on respective docking areas 651-656 on the top surface of the tray, and when the bottom surface of the tray is positioned adjacent to charging stations 611-616 such that the spatial patterns of the plurality of docking areas and the plurality of the charging stations are aligned, contact is made between each of the respective charging stations and a corresponding one of the flying machines via a respective at least one passageway of tray 602.

A flying machine may interface to a charging station using any suitable engagement. In some embodiments, for example, a charging station includes two or more electrical terminals configured to provide charging, communication, or both, with the flying machine. The flying machine may include corresponding electrical terminals which, when the flying machine is docked, contact the electrical terminals of the charging station, thus allowing electrical interactions between the charging station and an electrical circuit of the flying machine. The contact between the electrical terminals of the charging station and the corresponding electrical terminals of the flying machine may include any suitable engagement. For example, in some embodiments, the weight of the docked flying machine provides a normal force at the terminals to maintain contact. In a further example, deflection of the electrical terminals may provide a normal force (e.g., a spring force from deflection) at the terminals to maintain contact. In a further example, an electrical terminal may include a flat pad (e.g., metal pads), a tab, a pin, a bayonet, a socket, a plug, any other suitable feature (e.g., a compression contact or a swipe contact) allowing electrical contact between electrical terminals of the charging station and the flying machine, or any combination thereof.

In some embodiments, charging surface 604, any or all of charging stations 611-625, or a combination thereof, detect which tray has been placed on charging surface 604. In some embodiments, charging surface 604, any or all of charging stations 611-625, or a combination thereof, detect where a tray (e.g., tray 602) has been placed on charging surface 604. In some embodiments, a charging surface, a charging station, or both, implement near field communication (NFC), recognition of a fiducial, recognition of a bar code, recognition of a quick response (QR) code, recognition of an impedance between electrical contacts having a unique impedance (e.g., each tray may have a unique impedance across two contacts), recognition of the state of multiple contacts, jumpers, or switches that are open or closed in a particular combination for each tray, recognition of a property of a tray (e.g., a color, a shape, a shape of a cutout, a mass, or other property), any other suitable detection technique, or any combination thereof. Determining which tray is coupled to a charging surface, and how it is coupled (e.g., arranged among charging stations of the charging surface), may aid in identifying which flying machine is docked to which docking area, tray, charging surface, or charging station. For example, it may be useful to determine which flying machine, or flying machines, is on a particular tray.

Figure 7:
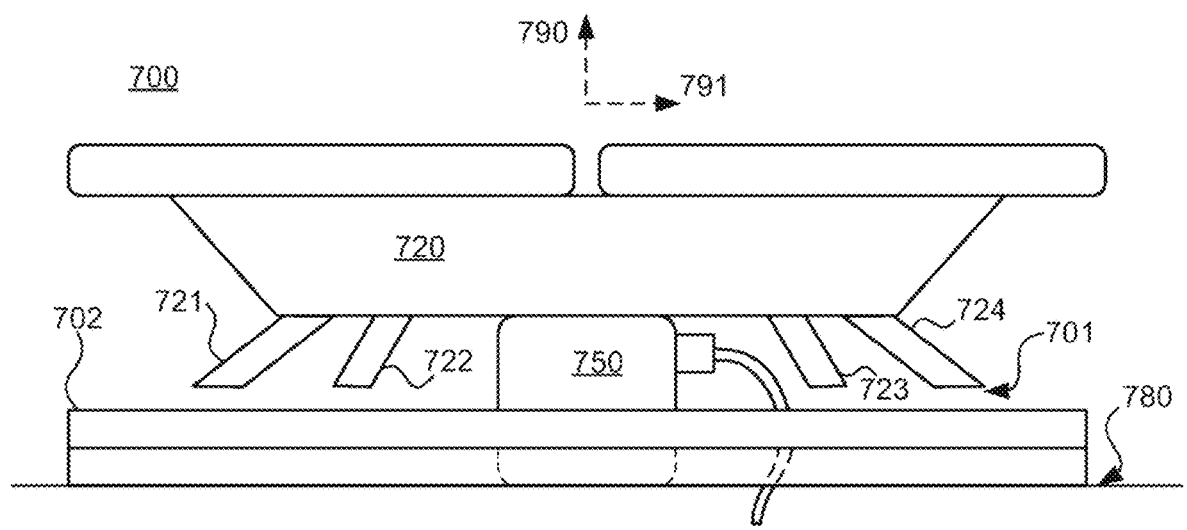
FIG. 7 shows a side view of an illustrative tray, with a flying machine coupled to a charging station, in accordance with some embodiments of the present disclosure.

FIG. 7 shows a side view of illustrative tray 702, with flying machine 720 coupled to charging station 750, in accordance with some embodiments of the present disclosure. Flying machine 720 is resting entirely on charging station 750 (e.g., the entire weight of flying machine 720 is supported by a normal force from charging station 750). Axis 790 is directed upwards, which is opposite to the direction of the gravitational force on flying machine 720 (i.e., the weight of flying machine 720). Flying machine 720 includes electrical terminals configured to engage corresponding electrical terminals of charging station 750. For example, the electrical terminals may be on the underside of flying machine 720, and the corresponding electrical terminals of charging station 750 may be arranged on the top of charging station 750. In some embodiments, the electrical terminals of charging station 750 or flying machine 720 may be arranged in one of the terminal patterns of FIGS. 3A-C.

To illustrate, in some embodiments, flying machine 720 rests on tray 702 when tray 702 is not positioned on a charging surface (e.g., there is no gap 701, and legs 721-724 contact tray 702). When tray 702 is positioned on charging surface 780, and flying machine 720 is docked to charging station 750, legs 721-724 may lift off from tray 702 (e.g., resulting in gap 701 as shown in FIG. 7) such that the entire weight of flying machine 720 is supported by charging station 750. Accordingly, the weight may aid in maintaining electrical contact between electrical terminals of flying machine 720 and corresponding electrical terminals of charging station 750. In some embodiments, tray 702 corresponds to tray 102 of FIG. 1, tray 402 of FIG. 4, tray 502 of FIG. 5, or tray 602 of FIG. 6.

Figure 8A:
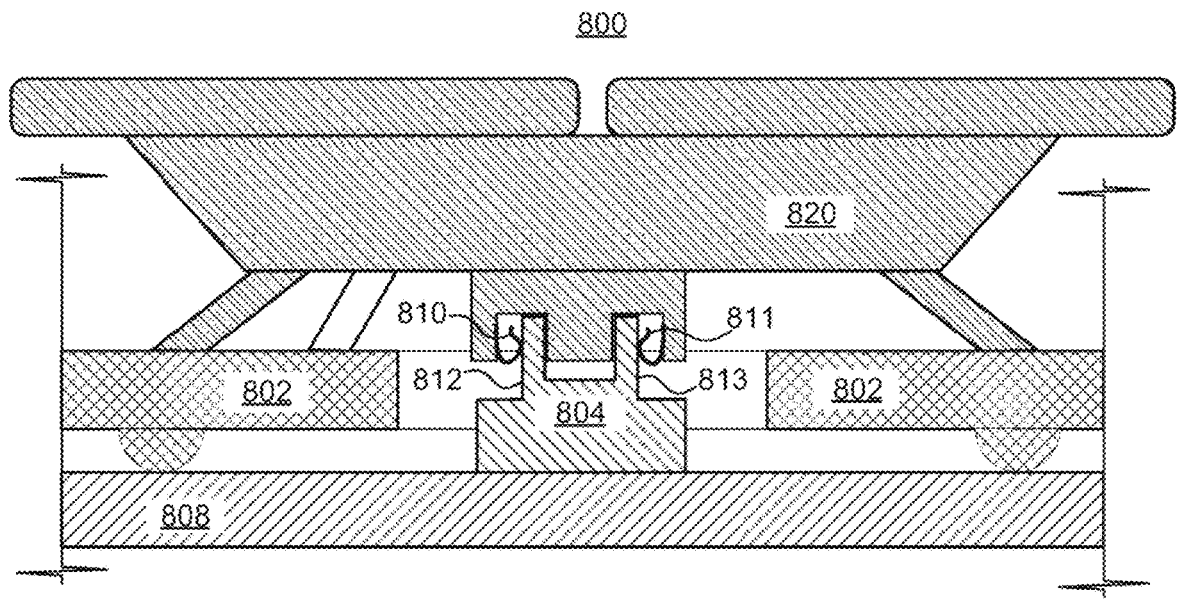
FIG. 8A shows a side view of an illustrative tray, with a flying machine coupled to a charging station with spring terminals, in accordance with some embodiments of the present disclosure.

FIG. 8A shows a side view of illustrative tray 802, with flying machine 820 coupled to charging station 804, arranged on charging surface 808, with spring terminals 810 and 811, in accordance with some embodiments of the present disclosure. Charging station 804 includes tabs 812 and 813, which include respective electrical terminals which interface with spring terminals 810 and 811. Spring terminals 810 and 811 are electrical terminals which provide a force on respective tabs 812 and 813 to maintain electrical contact. Accordingly, the weight of flying machine 820 need not provide the normal force on the electrical terminals of charging station 804, but rather spring terminals 810 and 811 provide the normal force from deflection (e.g., the normal force is dependent on the stiffness and deflection of spring terminals 810 and 811). For example, in some embodiments, spring terminals 810 and 811 are not stiff enough to prevent flying machine 820 from resting on its legs from the weight of flying machine 820. In a further example, in some embodiments, spring terminals 810 and 811 are stiff enough to provide a normal force that causes a friction force equal to the weight of flying machine 820, thus maintaining flying machine 820 in a raised position. In some embodiments, flying machine 820 remains in contact with tray 802 when tray 802 is positioned on charging surface 808. In some embodiments, flying machine 820 is lifted off of tray 802 by charging station 804 when tray 802 is positioned on charging surface 808. In some embodiments, tray 802 corresponds to tray 102 of FIG. 1, tray 402 of FIG. 4, tray 502 of FIG. 5, or tray 602 of FIG. 6.

Figure 8B:
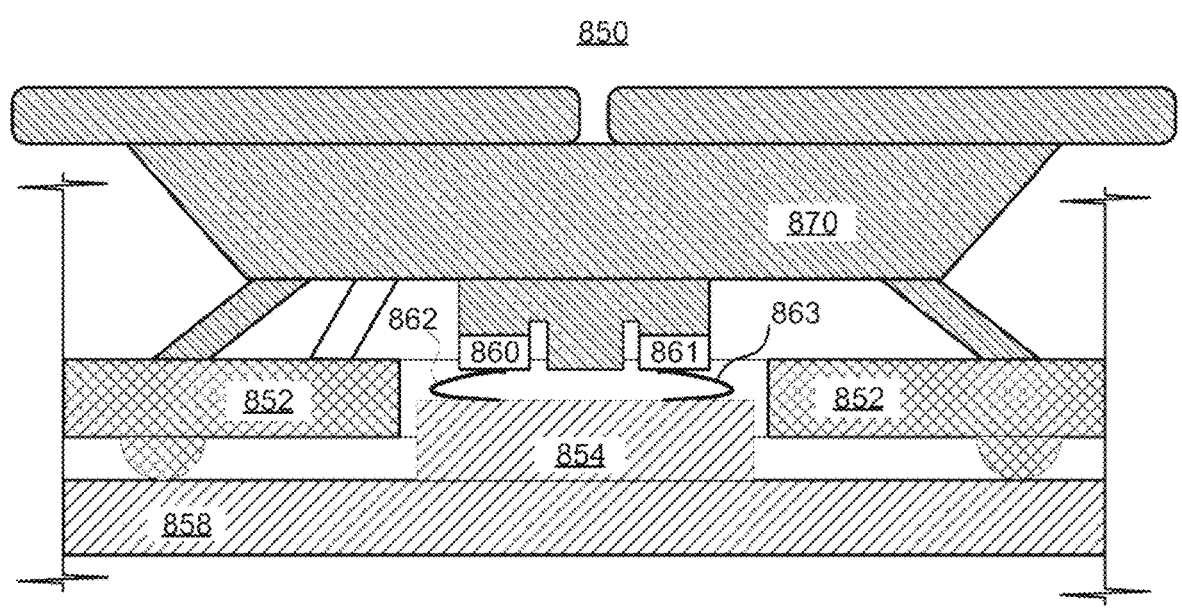
FIG. 8B shows a side view of an illustrative tray, with a flying machine coupled to a charging station with spring terminals, in accordance with some embodiments of the present disclosure.

FIG. 8B shows a side view of illustrative tray 852, with flying machine 870 coupled to charging station 854, arranged on charging surface 858, with electrical terminals 860 and 861, in accordance with some embodiments of the present disclosure. Charging station 854 includes spring terminals 862 and 863, which include respective electrical terminals which interface with electrical terminals 860 and 861. Electrical terminals 860 and 861 are electrical terminals which provide a force on respective spring terminals 862 and 863 to maintain electrical contact. Spring terminals 862 and 863 are configured to deflect under the weight of flying machine 870 and provide a reaction force due to deflection. The weight of flying machine 870 may, but need not, provide all of the normal force on the electrical terminals of charging station 854. For example, in some embodiments, spring terminals 862 and 863 are not stiff enough to prevent flying machine 870 from resting on its legs from the weight of flying machine 870. In a further example, in some embodiments, spring terminals 862 and 863 are stiff enough to provide a normal force equal to the weight of flying machine 870, thus maintaining flying machine 870 in a raised position. In some embodiments, flying machine 870 remains in contact with tray 852 when tray 852 is positioned on charging surface 858. In some embodiments, flying machine 870 is lifted off of tray 852 by charging station 854 when tray 852 is positioned on charging surface 858. In some embodiments, tray 852 corresponds to tray 102 of FIG. 1, tray 402 of FIG. 4, tray 502 of FIG. 5, or tray 602 of FIG. 6.

The arrangements shown in FIGS. 8A-8B provide illustrative examples, of docked flying machines and charging stations. Any suitable docking arrangement may be used in accordance with the present disclosure. For example, any suitable number of terminals (e.g., two, three, four, or more) may be included as part of a flying machine, included as part of a charging station, or engaged between a flying machine and charging station.

Figure 8C:
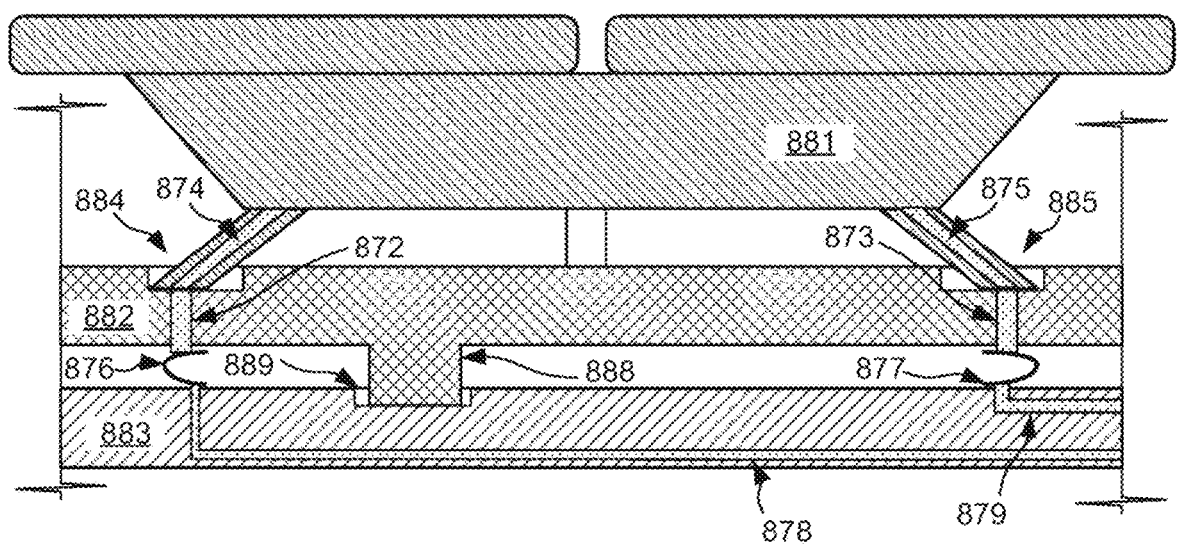
FIG. 8C shows a side view of an illustrative tray, having no passageways, with a flying machine docked, in accordance with some embodiments of the present disclosure.

FIG. 8C shows a side view of illustrative tray 882, having no passageways, with flying machine 881 docked, in accordance with some embodiments of the present disclosure. Tray 882 includes recesses 884 and 885, having respective electrical terminals. Tray 882 includes conductive traces 872 and 873, which are configured to connect the electrical terminals of recesses 884 and 885 to respective spring contacts 876 and 877. Charging surface 883 includes recess 889, which is configured to engage feature 888. In some embodiments, recess 889 and feature 888 need not be included. In some embodiments, recess 889 and feature 888 are integrated near the electrical interfaces (e.g., at the spring contacts). Charging surface 883 includes conductive traces 878 and 879, which couple respective spring contacts 876 and 877 to suitable circuitry (e.g., control circuitry). Accordingly, no charging station is needed in arrangement 880. Flying machine 881 is configured to dock to tray 882 when its legs are positioned in respective recesses of tray 882 (e.g., recesses 884 and 885). The legs include respective electrical contacts/conductors 874 and 875, which are configured to contact corresponding electrical contacts of respective recesses 884 and 885. Accordingly, when docked, flying machine 881 may receive charge from, communicate with, or otherwise electrically interact with control circuitry via charging surface 883 and tray 882. In some embodiments, conductive traces 872 and 873 of tray 882, and conductive traces 878 and 879 of charging surface 883 allow docking without a passageway. In some embodiments, spring contacts 876 and 877 are stiff enough to support the weight of tray 882 and any docked flying machines (e.g., flying machine 881). In some embodiments, spring contacts 876 and 877 need not be stiff enough to support the weight of tray 882 and any docked flying machines (e.g., flying machine 881), and other features may be implemented for support (e.g., recess 889 and feature 888). In some embodiments, spring contacts may be used in recesses 884 and 885 to ensure a proper electrical connection between electrical contacts 874 and 875 to conductive traces 872 and 873. In addition, it will be understood that any suitable number of electrical connections may be made through tray 882 for each docking station. For example, additional electrical connections may be made through additional recesses not shown in FIG. 8C.

Figure 8D:
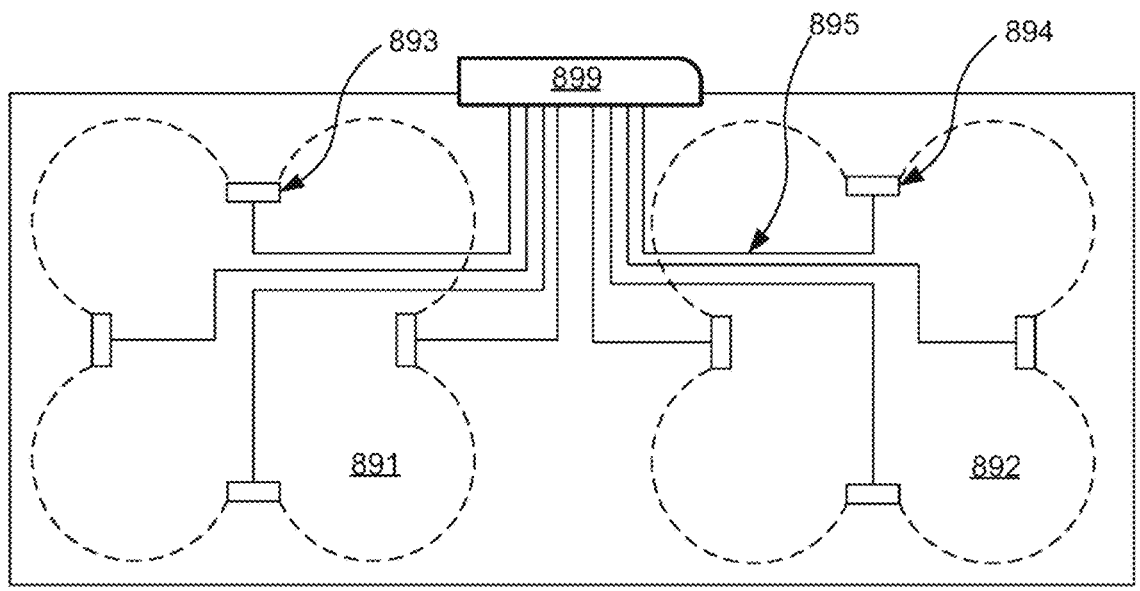
FIG. 8D shows a top view of an illustrative tray, having docking areas without passageways, in accordance with some embodiments of the present disclosure.

FIG. 8D shows a top view of illustrative tray 890, having docking areas 891 and 892 without passageways, in accordance with some embodiments of the present disclosure. Docking area 891 includes recesses 893 having corresponding electrical terminals. Docking area 892 includes recesses 894 having corresponding electrical terminals. Conductive traces 895 route from respective electrical terminals of docking areas 891 and 892 to connector 899. In some embodiments, connector 899 includes, for example, a plug, a socket, any other suitable connector, or any combination thereof. For example, connector 899 may include pins (e.g., as part of a connector), spring terminals, screw terminals, a DB connector, a back-plane type slotted interface, a cable harness, any other suitable electrical terminal type, any suitable features for securing connections, or any combination thereof. In some embodiments, conductive traces 895 may include printed conductive material (e.g., on a printer circuit board (PCB)), routed wires, any other suitable conductors, or combination thereof. In some embodiments, connector 899 is not included, and conductive traces 895 may still be grouped in an interface region for electrically coupling to suitable circuitry.

In some embodiments, a flying machine charging apparatus includes a tray, which in turn includes a plurality of docking areas arranged on a top surface of the tray in a spatial pattern. In some embodiments, each of the plurality of docking areas is configured to receive a respective one of a plurality of flying machines. Each docking area includes at least one mechanical feature configured to interact with a corresponding portion of a flying machine to maintain the flying machine in the docking areas. For example, a feature may include a recess having one or more corresponding electrical terminals. In some embodiments, each docking area also includes a plurality of electrical terminals configured to contact corresponding electrical terminals of the respective flying at least when the flying machine is docked to the docking area. In some embodiments, the tray includes a plurality of conductive traces, which are configured to couple the plurality of electrical terminals of each docking area to one or more interface regions (e.g., a collection of electrical terminals which may be convenient for engaging with a connector). In some embodiments, when the plurality of flying machines are positioned on the plurality of docking areas on the top surface of the tray, contact is made between electrical terminals of each docking area and a corresponding flying machine.

In some embodiments of the present disclosure, one or more trays are used to store a plurality of flying machines. For example, between use and when being transported, the one or more trays may be stored in a storage container (e.g., in a container with multiple sliding shelfs). If the storage container is bumped into or jostled during transport, the flying machines can be dislodged from their respective docking areas and get damaged. Accordingly, one or more protective pieces such as protective layers can be used to protect the flying machines (e.g., above and/or below the flying machines). Such productive layers may take up space when not in use and as such it would be useful to provide storage for the protective layers when not being used.

Figure 9:
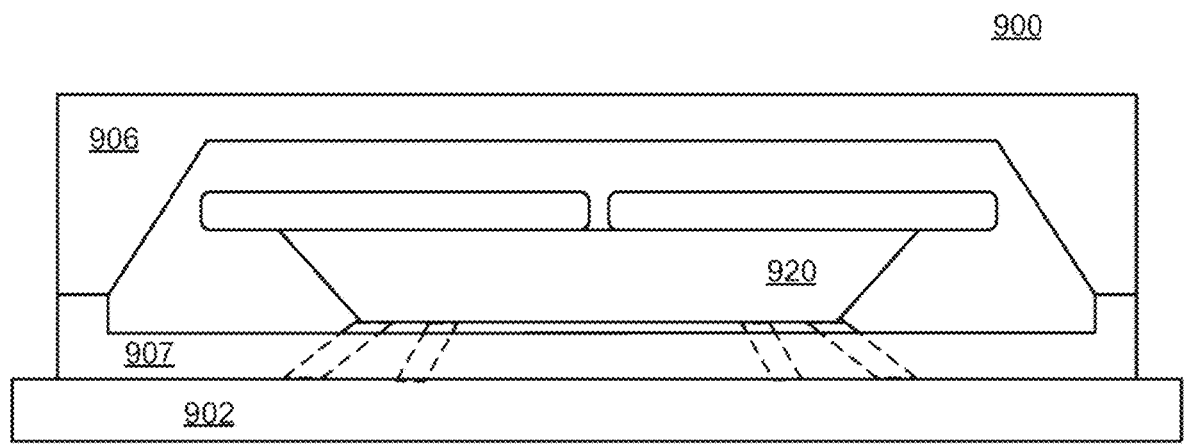
FIG. 9 shows a side view of an illustrative flying machine on a tray, protected with foam pads, in accordance with some embodiments of the present disclosure.

In some embodiments, in order to protect one or more flying machines from damage during transport or when not in use, one or more protective layers may be included. For example, two protective layers may be used to "sandwich," or otherwise surround a flying machine to provide a securement. In a further example, a protective layer may include a foam pad, or other relatively soft material. FIG. 9 shows a side view of illustrative flying machine 920 on tray 902 protected with foam pads 906 and 907, in accordance with some embodiments of the present disclosure. As shown, flying machine 920 is arranged between foam pads 906 and 907. Foam pad 907 is configured to rest on tray 902. Foam pads 906 and 907 are configured to provide padding (e.g., reducing impact loading) in the event that flying machine 920 is jostled (e.g., during transport or storage). In some embodiments, a pair of foam pads include one flat foam pad, with the other pad having a recess capable of accommodating a flying machine. In some embodiments, a pair of foam pads includes two foam pads each having a recess which in total is capable of accommodating a flying machine (e.g., as shown by foam pads 906 and 907 in FIG. 9).

In some embodiments, arrangement 900 is achieved by positioning a protective layer (i.e., foam pad 907) onto tray 902. Flying machine 920 is then positioned onto the protective layer. Finally, a second protective layer (e.g., foam pad 906) is positioned on top of flying machine 920. The second protective layer may engage the first protective layer (e.g., foam pad 907), flying machine 920, or both. While only a single flying machine is shown in FIG. 9 (i.e., flying machine 920), more than one flying machine may be protected by one or more protective layers. For example, a pair of foam pads may house a plurality of flying machines, and accordingly, the foam pads may include a corresponding plurality of recesses. Although not shown in FIG. 9, in some embodiments, a charging station may be included in a protected arrangement. For example, protective layers may be configured to protect one or more docked flying machines, and may accordingly accommodate a charging station with a corresponding recess. In some embodiments, a single protective layer is used. For example, in some embodiments, a protective layer similar to foam pad 906 may be configured to reach tray 902, and no foam pad 907 is needed, to protect flying machine 920.

In some embodiments, as shown in FIG. 9, a protective layer may include one or more openings to accommodate legs of a flying machine.

In some embodiments, foam pads 906 and 907 do not make contact with flying machine 920 when flying machine 920 is resting on tray 902 or a corresponding charging station. As shown in FIG. 9, there is a small gap between flying machine 920 and foam pads 906 and 907. This allows limited movement of flying machine 920. In the event of significant jostling, flying machine 920 will make contact with one or both of foam pads 906 and 907, which will limit the amount of movement and provide cushioning to reduce or prevent damage of flying machine 920. In some embodiments, one or both of foam pads 906 and 907 make contact with flying machine 920 when flying machine 920 is resting on tray 902 or a corresponding charging station. For example, foam pad 906 may be arranged to make contact with the frame of flying machine 920 to limit or prevent movement of flying machine 920. It will be understood that foam pads 906 and 907 can be used with tray 102 of FIG. 1, tray 402 of FIG. 4, tray 502 of FIG. 5, or tray 602 of FIG. 6. In some embodiments, foam pad 906 may include one or more cutouts, holes, or gaps to allow an operator to view indicator lights on the tray or charging surface.

Figures 10A, 10B:
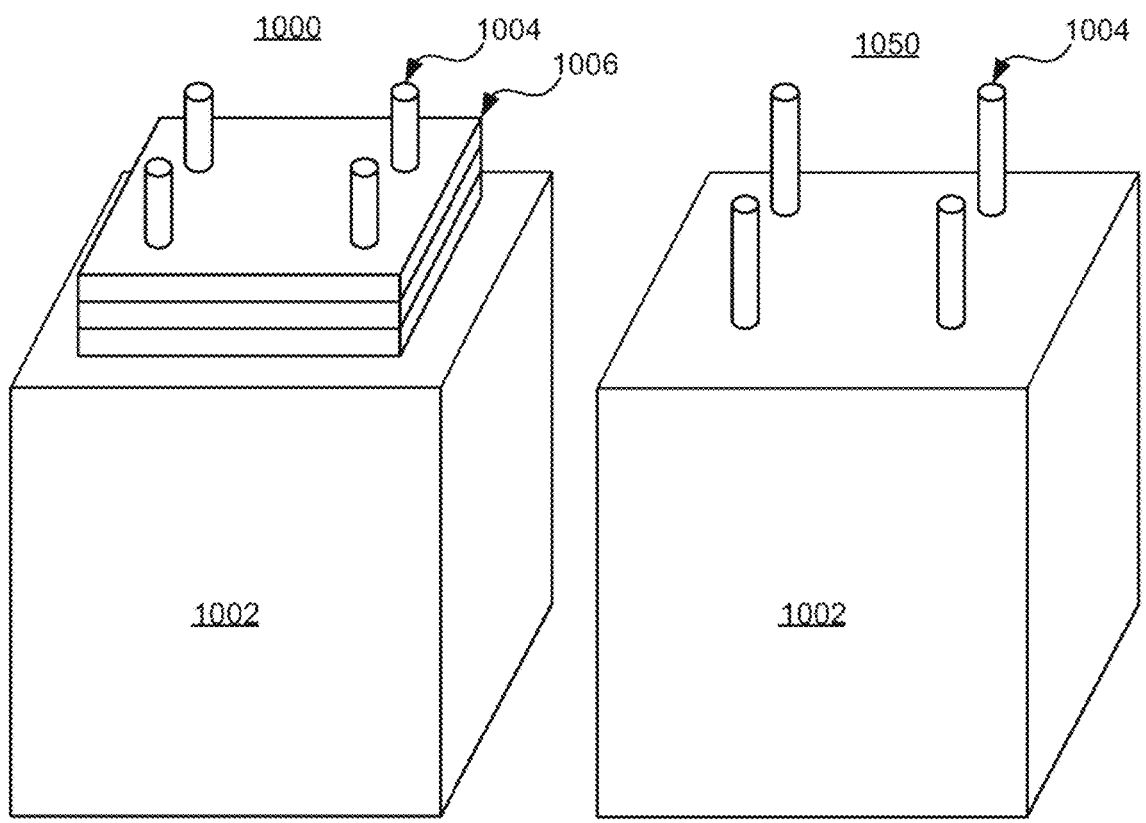
FIG. 10A shows a perspective view of illustrative foam storage posts on a storage container, with foam pads, in accordance with some embodiments of the present disclosure.
FIG. 10B shows a perspective view of illustrative foam storage posts on a storage container, without foam pads, in accordance with some embodiments of the present disclosure.

FIG. 10A shows a perspective view of illustrative foam storage posts 1004 on storage container 1002, with foam pads 906, in accordance with some embodiments of the present disclosure. FIG. 10B shows a perspective view of foam storage posts 1004 on storage container 1002, without foam pads, in accordance with some embodiments of the present disclosure. Foam pads 1006 may be configured to house and secure flying machines on trays, for example, during transport or storage. For example, foam pads 1006 may include foam pads 906 and foam 907 of FIG. 9. Foam pads 1006 may include holes, notches, slots, or other suitable features for interfacing with storage posts 1004. While four foam storage posts 904 are shown in FIGS. 10A-10B, any suitable number of posts may be used. For example, 1, 2, 3, 4 5, 6, or some other suitable integer of posts may be included, and configured to store foam pads. Foam storage posts may be positioned at any suitable location on the storage container or other support structure, in any suitable arrangement. For example, foam storage posts may be included on the back, or side, of storage container 1002.

Figure 11:
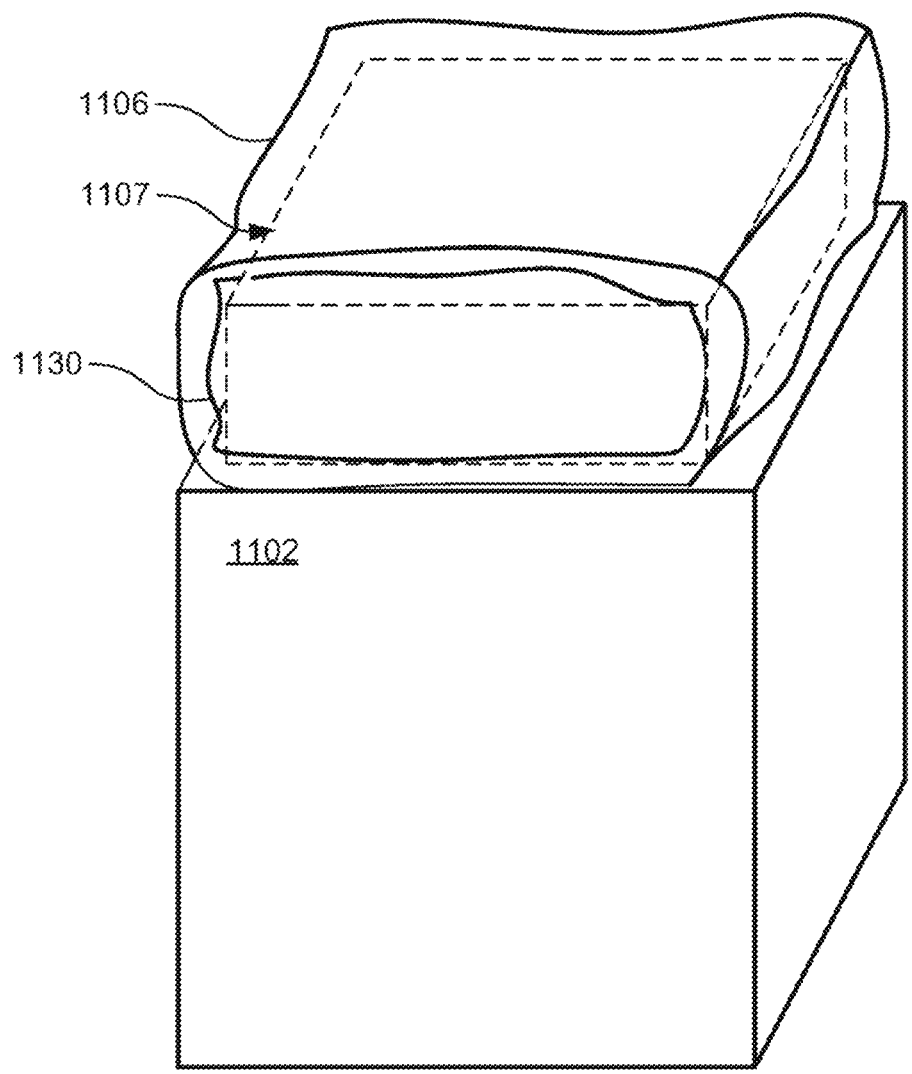
FIG. 11 shows a front view of an illustrative foam storage bag, in accordance with some embodiments of the present disclosure.

FIG. 11 shows a front view of illustrative foam storage bag 1106, in accordance with some embodiments of the present disclosure. Foam storage bag 1106 is configured to store protective layers, (e.g., stacked foam pads 1107). Stacked foam pads may include foam pads 906 and foam 907 of FIG. 9. Foam storage bag 1106 includes zipper 1130 to provide access to the interior of the storage bag and to seal the storage bag once foam pads are inserted into the storage bag. In some embodiments, foam storage bag 1106 is configured to rest on top of, or otherwise mount to, storage container 1102 as shown in FIG. 11. In some embodiments, foam storage bag 1106 is positioned on the back, or side, of rack 1102. In some embodiments, foam storage bag 1106 is stored in storage container 1102 (e.g., on a shelf or a suitable storage tray).

Figure 12:
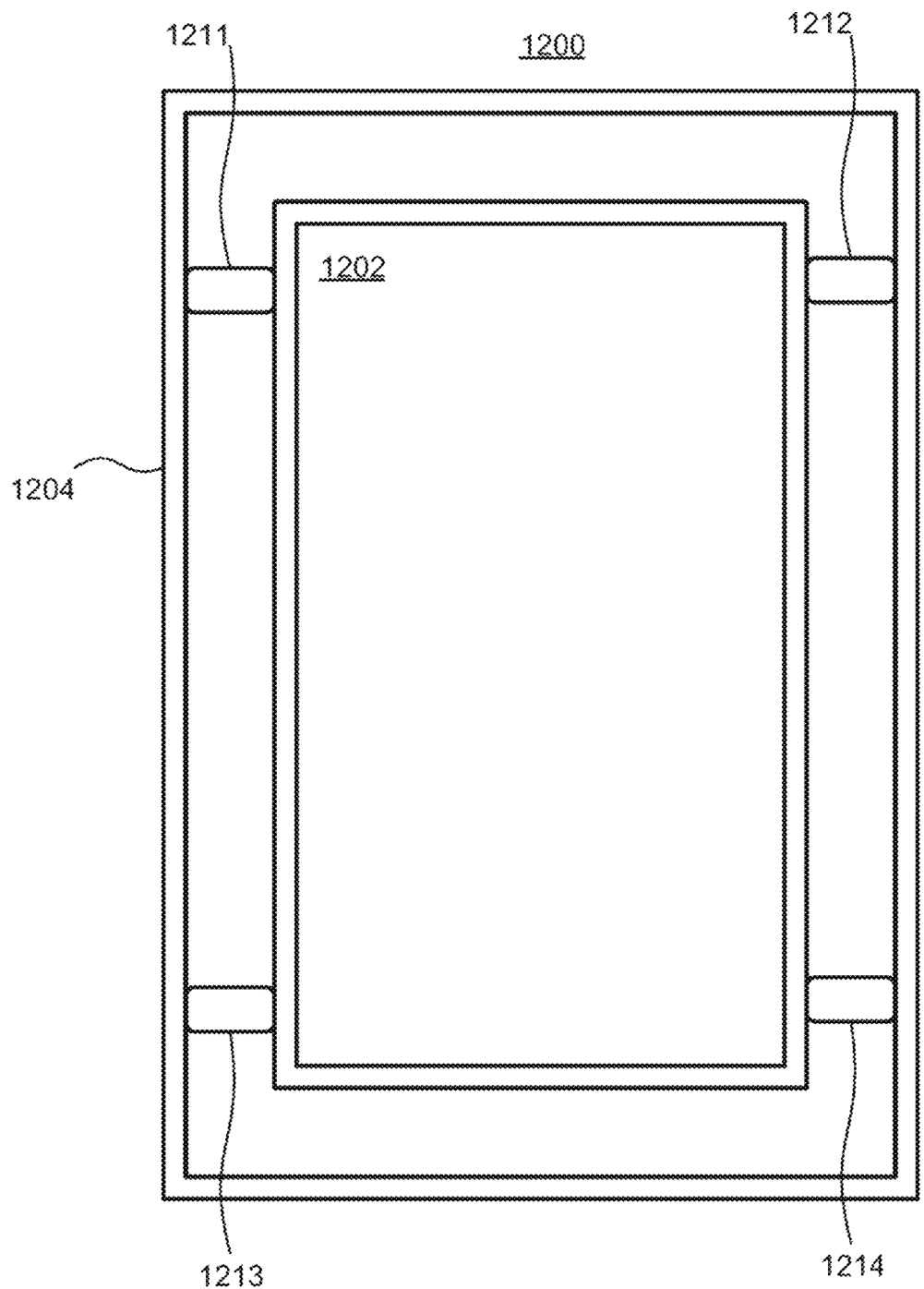
FIG. 12 shows a front view of an illustrative charging station enclosure, in accordance with some embodiments of the present disclosure.

In some circumstances, when flying machines are transported, additional protection may be used to reduce potential damage to the flying machines, charging stations, the storage container (e.g., a rack), or a combination thereof. In some circumstances, flying machines may be used as part of a performance (e.g., a concert) and the equipment is transported between venues. Additionally, between performances at a particular venue, the equipment may be stored and packed away. Accordingly, in some embodiments, additional protection is used. For example, the storage container may be surrounded by, and connected to, an outer enclosure using vibration dampening mounts to soften impacts. FIG. 12 shows a front view of illustrative charging station enclosure 1200, in accordance with some embodiments of the present disclosure. Charging station enclosure 1200 includes rack 1202, outer case 1204 and vibration dampening mounts 1211, 1212, 1213, and 1214. Rack 1202 is coupled to outer case 1204 by vibration dampening mounts 1211-1214. In some embodiments, vibration dampening mounts 1211-1214 include bushings, gaskets, any other suitable vibration dampening component, of any suitable material, or any combination thereof. Vibration dampening mounts 1211-1214 are configured to reduce impact on rack 1202, which may house one or more trays and flying machines for example, from transport or rough handling of charging station enclosure 1200.

It will be understood that rack 1202 can be considered an inner frame and outer case 1204 can be considered an outer frame. The inner frame can be any suitable storage container for storing and/or charging flying machines. In some embodiments, outer case 1204 includes wheels (e.g., casters) on the bottom and/or handles (e.g., recessed handles on the sides) to enable easy movement of the storage container.

The foregoing discussion and figures referred to electrical terminals for charging and communication and also indicator lights. The details of these electrical components and other circuitry components were not discussed above or shown for simplicity. The details of the circuitry that may be included in a charging station, flying machine, and charging surface are discussed in the context of FIGS. 13-15. For example, a flying machine may include a rechargeable power supply (e.g., a battery), and corresponding circuitry to manage power. In a further example, a flying machine may include processing circuitry and sensors, configured to control motion of the flying machine. In a further example, a charging station, a charging module, or both, may include circuitry for managing charging of a flying machine.

Figure 13:
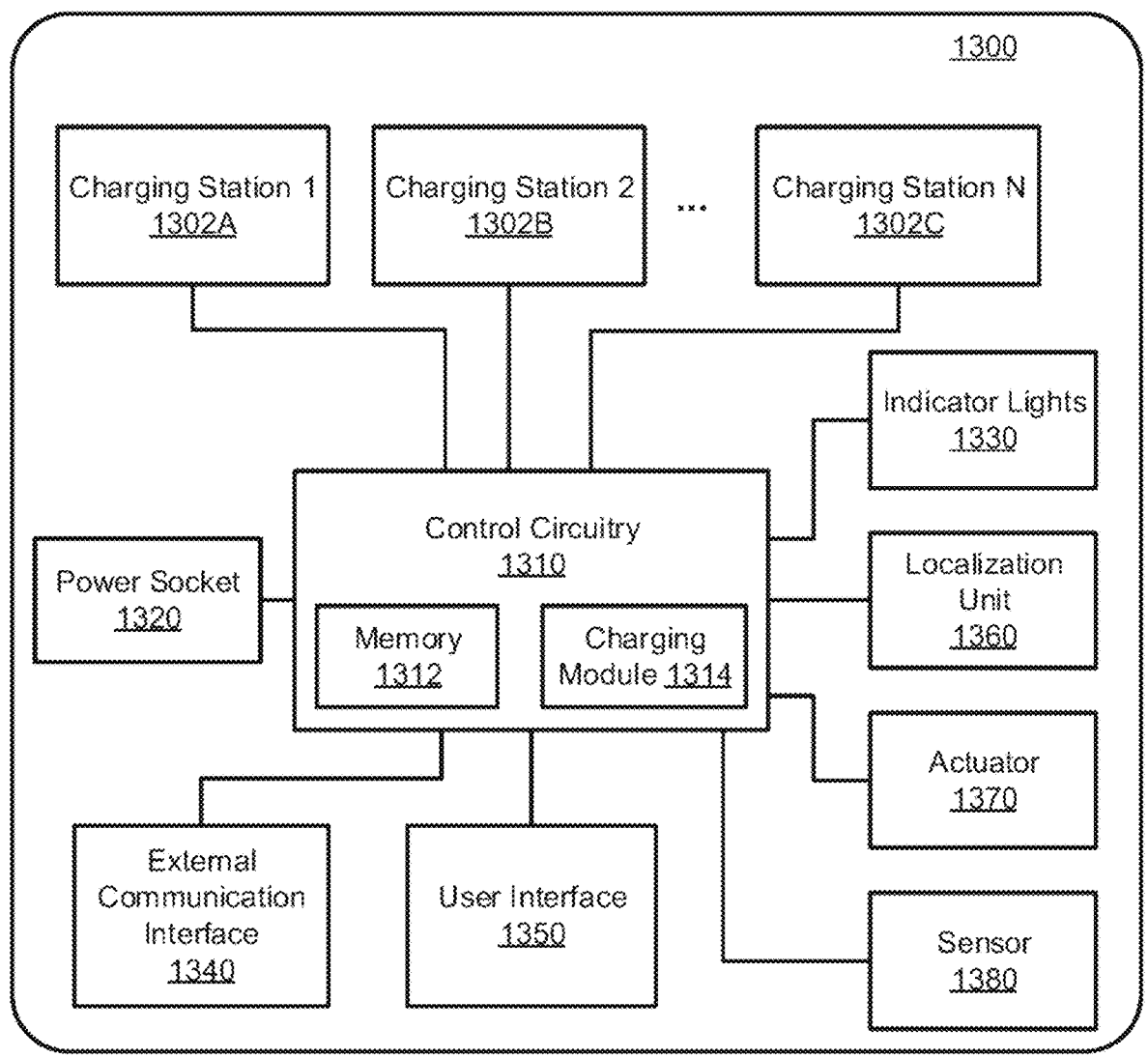
FIG. 13 shows a block diagram of illustrative electrical components of a charging surface, in accordance with some embodiments of the present disclosure.

FIG. 13 shows a block diagram of illustrative electrical components of a charging surface 1300 in accordance with some embodiments of the present disclosure. Charging surface 1300 comprises charging stations 1302A-C, control circuitry 1310, power socket 1320, indicator lights 1330, communication interface 1340, user interface 1350, localization unit 1360, actuator 1370, and sensor 1380.

Charging stations 1302A-C may each comprise charging terminals and a communication interface. The charging terminals may be configured for electrical coupling with electrical connectors of flying machines. Each of charging stations 1302A-C may include two, three, four, or more charging terminals. For flying machines with a single cell battery, there may be only two charging terminals included as part of charging stations 1302A-C. For flying machines with multicell batteries, additional charging terminals may be provided to enable battery balancing. In some embodiments, charging stations 1302A-C correspond to charging stations 121-126 of FIG. 1, charging stations 611-625 of FIG. 6, charging station 750 of FIG. 7, charging station 804 of FIG. 8A, or charging station 854 of FIG. 8B

The communication interface for each of charging stations 1302A-C may be any suitable communication interface for enabling control circuitry 1310 to communication with a flying machine docked in a charging station. In some embodiments, the communication interface may use any suitable communication protocol such as Bluetooth, ZigBee, or WiFi. In some embodiments, the communication interface uses a wired communication protocol between the flying machine and control circuitry 1310. For example, a wired communication protocol may use serial, parallel, or both, to provide one-way or two-way communication. In a further example, a wired communication protocol may be implemented using a universal asynchronous receiver transmitter (UART), a controller area network (CAN bus), an inter-integrated circuit (I2C), any other suitable protocol, including any suitable bus, or any suitable combination thereof. The wired communication may be established by connecting at least one communication terminal on the charging station with at least one communication connector on the flying machine. In some embodiments, the communication interface may communicate with the flying machines using the charging terminals. This may, for example, be achieved using a DC-BUS. While three charging stations are depicted in FIG. 13, any suitable number of charging stations may be included in charging surface 1300. In some embodiments, charging surface 1300 may be used on sliding shelf 410 of FIG. 4 or correspond to charging surface 604 of FIG. 6, charging surface 780 of FIG. 7, charging surface 808 of FIG. 8A, or charging surface 858 of FIG. 8B.

Localization unit 1360 determines the location of charging surface 1300. Localization unit 1360 may include a receiver and one or more antennas for receiving localization signals. In some embodiments, localization unit 1360 determines the location based on the reception times of time-stampable localization signals (e.g., ultra-wideband signals) and known locations of the transceivers that transmit the signals. A received signal may be timestamped based on a local clock signal. The location may be determined using any suitable computations such as TOA or TDOA computations. The determined location is provided to control circuitry 1310. In some embodiments, localization unit 1360 is incorporated into control circuitry 1310. In some embodiments, localization unit 1360 may include a global positioning system (GPS) receiver, a camera-based simultaneous localization and mapping system, a WiFi signal-strength-based triangulation system, any other suitable system, or any combination thereof. In some embodiments, charging station 1300 does not include localization unit 1360.

In some embodiments, the localization unit determines distances to transceivers that transmit signals. This may be achieved using known techniques in the art. For example, the localization unit and the transceivers may have synchronized clocks, the signals can contain a time indicating when the signals are sent as timestamped by the transceivers before they are sent. When the localization unit receives the signals the timestamps on the signals are compared to the time which the localization unit has on its clock. This allows the localization unit to determine the time of flight of the signal, thus allowing it to determine the distance between the localization unit and each of the transceivers knowing that the each of the signals travelled at the speed of light. Another way to determine distance is to use the signal power. To do this, the strength of the signal as originally transmitted by each of the transceivers is known to the localization unit (e.g., stored in memory or is part of the transmitted signal). By measuring the strength of each of the signals received at the localization unit and using a Free-space Path Loss model, the distances between the localization unit and each of the transceivers can be estimated. In yet a further example the localization unit can determine its position by triangulation. The localization unit receives signals from at least three transceivers and estimates the distance to each of the three transceivers based on the received signals (e.g., based on the strength of the receiving signals). Knowing the locations of these three transceivers (e.g., stored in memory or part of the transmitted signal), the localization unit determines its location based on the estimated distance it is from each of the three transceivers.

Control circuitry 1310 can be implemented using any suitable hardware or combination of hardware and software. For example, control circuitry may include one or more processors, memory such as non-transitory computer readable memory, one or more software modules comprising computer-readable instructions, firmware, or any combination thereof.

Actuator 1370 can be any suitable actuator to assist in the operation of charging surface 1300. In some embodiments, actuator 1370 operates a motor to open and close a sliding shelf on which charging surface 1300 is positioned (e.g., sliding shelf 410 of FIG. 4). Suitable actuators may include servomotors or stepper motors. Actuator 1370 is controlled by control circuitry 1310. In some embodiments, actuator 1370 is only operated when charging surface 1300 is in an appropriate location as determined by localization unit 1360. In some embodiments, charging station 1300 does not include actuator 1370.

Sensor 1380 may be any suitable sensor or combination of sensors. For example, sensor 1380 may include one or more of an optical sensor, an accelerometer, a magnetometer, and a gyroscope. In some embodiments, control circuitry 1310 uses measurements from sensor 1380 to control operation of charging surface 1300. For example, control circuitry 1310 can use the measurements to determine whether charging surface 1300 is in a proper orientation (e.g., upright) and sufficiently level to release and receive flying machines. This may, for example, be achieved by equipping the tray with an appropriate sensor such as an accelerometer or a magnetometer. In some embodiments, sensor 1380 is used to determine whether a flying machine is positioned at each charging station. This may, for example, be achieved using a Hall sensor, optical sensor, current sensor, or displacement sensor. In some embodiments, charging station 1300 does not include sensor 1380. In some embodiments, sensor 1380 is configured to monitor the power supply, or charging provided thereof, by sensing voltage (e.g., across suitable electrical terminals), current (e.g., flowing at one or more electrical terminals), temperature (e.g., of an electrical component or connection), or any other suitable property.

In some embodiments, sensor 1380 is configured to detect which tray has been placed on a tray (e.g., at a docking area), a charging surface, a charging station, or a combination thereof. In some embodiments, sensor 1380 is configured to detect where, or how, a tray has been placed on a charging surface. In some embodiments, control circuitry 1310 is configured to implement near field communication (NFC), recognition of a fiducial, recognition of a bar code, recognition of a quick response (QR) code, recognition of an impedance between electrical contacts having a unique impedance (e.g., each tray may have a unique impedance across two contacts), recognition of the state of multiple contacts, jumpers, or switches that are open or closed in a particular combination for each tray, recognition of a property of a tray (e.g., a color, a shape, a shape of a cutout, a mass, or other property), any other suitable detection technique, or any combination thereof. Determining which tray is coupled to a charging surface, and how it is coupled (e.g., arranged among charging stations of the charging surface), may aid in identifying which flying machine is docked to which docking area, tray, charging surface, or charging station. For example, it may be useful to determine which flying machine, or flying machines, is on a particular tray. In some embodiments, control circuitry 1310 may process signals from sensor 1380 to identify a tray, or corresponding tray information. For example, control circuitry 1310 may determine a SOC (e.g., how long a tray has been in place to provide charge to docked flying machines), a location (e.g., the location of one or more particular trays, each storing particular flying machines), a type (e.g., a size of a tray, a type of flying machine configured to dock on the tray, a spatial pattern of docking areas of the tray), any other suitable information or determination regarding a tray, or any combination thereof.

Figure 14:
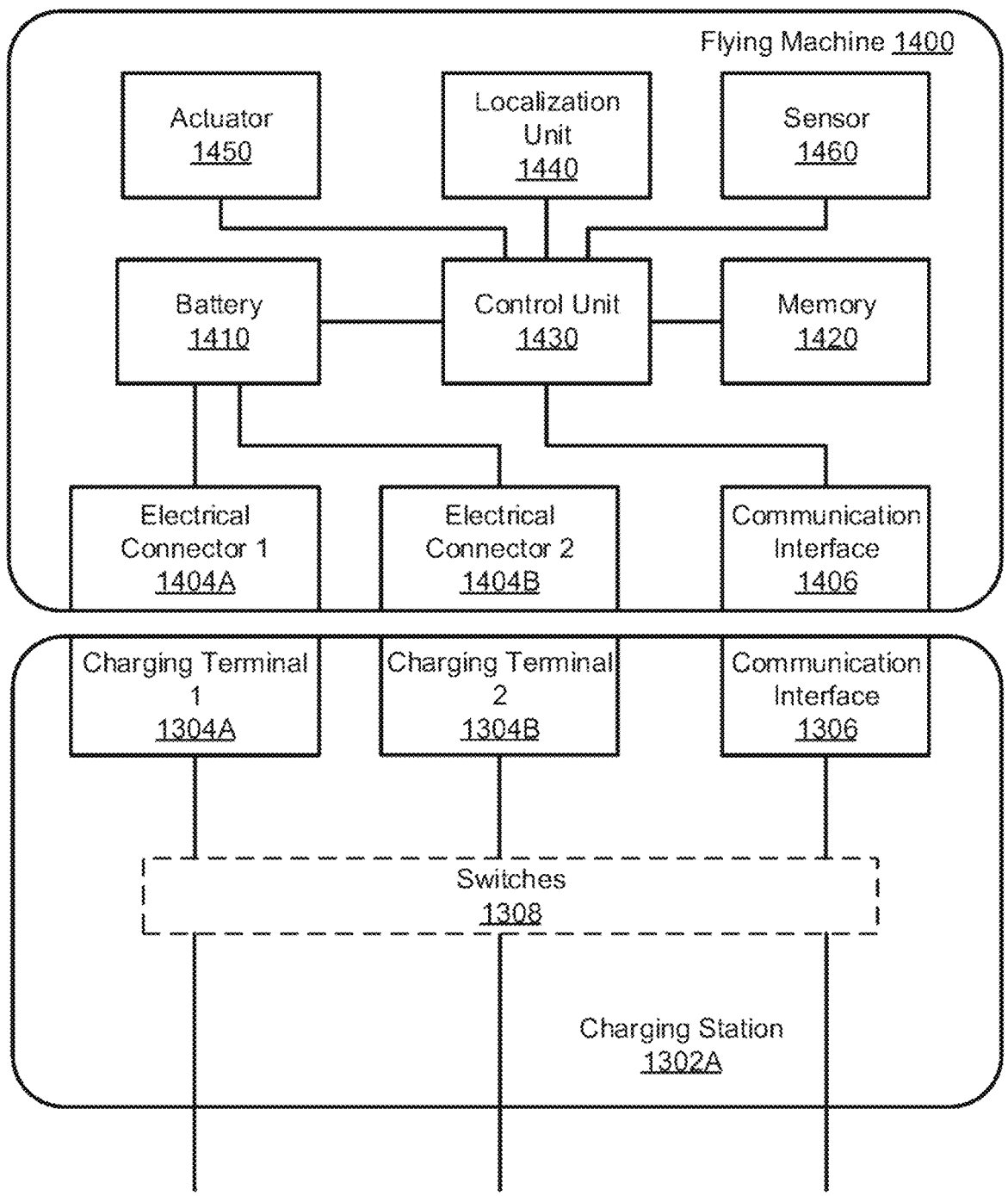
FIG. 14 shows a block diagram of illustrative electrical components of a charging station and a flying machine, in accordance with some embodiments of the present disclosure.

FIG. 14 shows a block diagram of illustrative electrical components of charging station 1302A of FIG. 13 and a flying machine 1400 in accordance with some embodiments of the present disclosure. As illustrated in FIG. 14, charging station 1302A here includes two charging terminals, charging terminals 1304A and 1304B. Charging terminals 1304A and 1304B are capable of being electrically coupled with respective electrical connectors 1404A and 1404B of flying machine 1400. In some embodiments, terminals 1304A and 1304B and connectors 1404A and 1404B are electrically conductive and the electrical coupling is achieved by physical contact.

As discussed above, the weight of flying machine 1400 may be used to ensure good physical contact. Additionally or alternatively, a magnet may be used to ensure good physical contact between a charging station and a flying machine, a docking area and a flying machine, or both. For example, one or more of charging terminals 1304A and 1304B and electrical connectors 1404A and 1404B may comprise a permanent magnet or an electromagnet. In some embodiments, the pull force of the magnet may be sufficiently high to ensure good physical contact, but less than the force flying machine 1400 is capable of generating for lifting off of charging station 1302A. When the magnet is an electromagnet, which is capable of being turned on and off, the pull force may be set to be high enough to physically fixate flying machine 1400 to charging station 1302A. In some embodiments, the pulling force of an electromagnet may be adjustable and controllable (e.g., by control circuitry 1310 of FIG. 13). The electromagnet may be turned off to enable flying machine 1400 to lift off of charging station 1302A (e.g., based on an indication that lift-off is desired). In some embodiments, a flying machine includes one or more ferrous features or components, which are acted on by the pulling force. For example, an electrical contact, a fastener, a pin, or any other component, may be included in a flying machine, or charging station (e.g., and the flying machine may include a magnet), to be acted on by a pulling force. The foregoing examples are merely illustrative and any suitable magnetic pulling force (i.e., magnetic attractive force) may be used in accordance with the present disclosure.

In some embodiments, terminals 1304A and 1304B and connectors 1404A and 1404B comprise induction coils and are inductively coupled to each other to enable inductive charging. In one example, terminals 1304A and 1304B comprise relatively large inductive coils and connectors 1404A and 1404B comprise relatively small inductive coils. By using larger inductive coils or power at terminals 1304A and 1304B, the inductive coils on flying machine 1400 may be dimensioned smaller and thus reduce weight for flying machine 1400. Connectors 1404A and 1404B are electrically coupled to battery 1410 to enable charging of the battery. It will be understood that additional charging terminals and corresponding electrical connectors may be provided to enable charge balancing of battery 1410.

Charging station 1302A of FIG. 14 also includes communication interface 1306 and flying machine 1400 also includes a corresponding communication interface 1406. Interfaces 1306 and 1406 may be any suitable wired or wireless communication interfaces to enable communication between flying machine 1400 and charging station 1302A. Examples of wireless communication interfaces that may be used include Bluetooth, ZigBee, and WiFi. In some embodiments, each charging station includes a wireless communication interface to communicate with a flying machine docked at the charging station. In some embodiments, one or more wireless communication interfaces are provided as part of charging surface 1300 or as part of a storage container to communicate with a plurality of flying machines docked on charging surface 1300 or on a tray. Communication interface 1406 of flying machine 1400 may be coupled to memory 1420 through control unit 1430. Memory 1420 may be any suitable non-transitory computer readable memory. Memory 1420 may store computer-readable instructions that are executable by processing circuitry (e.g., control unit 1430). Memory 1420 may also store information about flying machine 1400. For example, memory 1420 may store an ID number for flying machine 1400, battery information about battery 1410, and flight plan information for flying machine 1400. The battery information may include battery voltage, the number of battery cells, battery capacity, battery charge history, any other suitable battery information and any combination thereof. The information stored in memory 1420 may be communicated to a charging surface via communication interfaces 1406 and 1306. It will be understood that a wired communication interface may use separate wires or may use one or more wires in common with charging terminals 1304A and 1304B. For example, a wired communication interface may communicate over charging terminals 1304A and 1304B using DC-BUS technology.

In some embodiments, charging station 1302A uses terminal pattern 300 of FIG. 3A, terminal pattern 330 of FIG. 3B, or terminal pattern 360 of FIG. 3C. When using terminal pattern 300, for example, switches 1308 may be included to connect the appropriate terminals of charging station 1302A to the corresponding terminals of flying machine 1400. In some embodiments, switches 1308 are not included.

FIG. 14 also shows flying machine 1400 as also including localization unit 1440, actuator 1450, and sensor 1460. Localization unit 1440 computes the location of flying machine 1400. In some embodiments, localization unit 1440 includes the functionality and components of localization unit 1360 as described above. Localization unit 1440 provides the determined location to control unit 1430. In some embodiments, localization unit 1440 is incorporated into control unit 1430. In some embodiments, flying machine 1400 does not include localization unit 1440.

Control unit 1430 can be implemented using any suitable hardware or combination of hardware and software. For example, control unit 1430 may include one or more processors, memory such as non-transitory computer readable memory, one or more software modules comprising computer-readable instructions, firmware, or any combination thereof.

Actuator 1450 can be any suitable actuator for controlling the motion of flying machine 1400. For example, actuator 1450 can be a motor coupled to a propeller. Actuator 1450 may comprise a single motor (e.g., for a fixed wing aircraft) or multiple motors (e.g., for a multicopter). Actuator 1450 is controlled by control unit 1430. In some embodiments, flying machine 1400 is capable of autonomous flight and control unit 1430 determines one or more control signals that are provided to actuator 1450. In some embodiments, the one or more control signals are used to vary the thrust produced by one or more propellers that are coupled to one or more actuators 1450. In some embodiments, control unit 1430 determines the one or more control signals to cause flying machine 1400 to follow a desired flight path. In some embodiments, control unit 1430 uses one or more control loops to determine the one or more control signals based on a reference signal. In some embodiments, control unit 1430 compares the current position of flying machine 1400 to a reference position associated with the flight path.

Sensor 1460 may be any suitable sensor or combination of sensors. For example, sensor 1460 may include one or more of an optical sensor, radio frequency (RF) sensor, a Hall effect sensor, an accelerometer, a magnetometer, and a gyroscope. In some embodiments, control unit 1430 uses measurements from sensor 1460 to control operation of flying machine 1400. For example, control unit 1430 can use measurements from an optical sensor (e.g., a vision sensor) to detect a well-defined feature on a tray to assist in landing at a docking area. For example, the measurements from the optical sensor can be used to determine the relative position of flying machine 1400 to the well-defined feature and this information can be used to execute a landing or docking sequence. This may, for example, be achieved by using a fiducial with a known size and location on the tray and a calibrated camera on the flying machine to provide relative distance (size of fiducial on the camera sensor) and parallel displacement (position of the fiducial on the camera sensor) between the fiducial marker and the flying machine. In some embodiments, sensor 1460 can be used to identify the docking area or charging station at which flying machine

1400 is positioned. This may, for example, be achieved using a Hall sensor, optical sensor, current sensor, or displacement sensor. Flying machine 1400 can provide the identity of the docking area and/or charging station to charging surface 1300 using communication interface 1406. In some embodiments, flying machine 1400 does not include sensor 1460. In some embodiments, control circuitry 1310 of FIG. 13 communicates with control unit 1430 to determine a measurement or indication from sensor 1460. For example, sensor 1460 may be configured to detect a position (e.g., relative to a docking area), orientation, or location, and control circuitry 1310 may determine an orientation of flying machine 1400, which may also suggest an orientation for a tray to which flying machine 1400 is docked. In a further example, a plurality of flying machines docked to a tray may each include a sensor, and control circuitry 1310 may determine an orientation of the tray based on signals received from the sensors.

It will be understood that the details of FIG. 14 and the corresponding description are not limited to charging station 1302A. The details and corresponding description also apply to charging stations 1302B and 1302C of FIG. 13 and the other charging stations described herein.

Referring back to FIG. 13, control circuitry 1310 may include memory 1312 and a charging module 1314. Control circuitry 1310 may communicate with and control the operation of the electrical components of charging surface 1300. For example, control circuitry 1310 may detect the presence of a docked flying machine in each of charging stations 1302A-C (e.g., using one or more sensors 1380) and enable charging of the docked flying machines. Memory 1312 may be any suitable non-transitory computer readable memory. Memory 1312 may store computer-readable instructions that are executed by control circuitry 1310. Memory 1312 may also store information about charging status and charging history, information received from flying machines, information received from user interface 1350, any other suitable information, and any suitable combination thereof. Charging module 1314 charges flying machines docked at charging stations 1302A-C.

Charging module 1314 may operate under the control of control circuitry 1310 and may be configured to independently control the charging at each of charging stations 1302A-C. In some embodiments, charging module 1314 is configured to perform passive or active battery balancing. While charging module 1314 is shown as being separate from control circuitry 1310, in some embodiments the functionality of charging module 1314 may be integrated into control circuitry 1310, or vice-versa. In some embodiments, charging station 1300 does not include charging module 1314. For example, each flying machine may include a charging module.

Indicator lights 1330 may include any suitable visual indicators for indicating an alarm condition, charge status, connectivity status, maintenance status, correct tray status, any other suitable status or event, or any combination thereof. Statuses include, for example, completion of charging, battery failure, battery overheating, poor connection with a flying machine, any other suitable conditions, and any combination thereof. As an example, charging module 1314 may sense the temperature of batteries being charged and if the temperature of a battery exceeds a threshold (e.g., a normal charging temperature), indicator lights 1330 may indicate a corresponding alarm. In some embodiments, indicator lights 1330 may include one or more LEDs, having any suitable color and brightness, which may indicate to a user suitable information. In some embodiments, charging station 1300 does not include indicator lights 1330. In some embodiments, indicator lights 1330 are included in user interface 1350. For example, indicator lights 1330 may be included as part of a display of user interface 1350, and may be displayed as objects on a display screen.

In some embodiments, one or more indicator lights is configured to turn a first color when a corresponding flying machine is charging and second color when the corresponding flying machine is fully charged. In some embodiments, one or more indicator lights is configured to be off when a corresponding flying machine is not connected to a network and turn a first color when the corresponding flying machine is connected to the network.

In some embodiments, a charging system includes a set of indicator lights coupled to a plurality of charging stations. In some embodiments, the set of indicator lights includes a first plurality of indicator lights configured to indicate a level of charge of each of a plurality of docked flying machines (e.g., when the plurality of flying machines are coupled to the plurality of charging stations). In some such embodiments, the set of indicator lights also includes a second plurality of indicator lights configured to indicate a connectivity status of each of the plurality of flying machines to a network when the plurality of flying machines are docked.

Power socket 1320 may be configured to physically and electrically connect to a removable external power cable, which can be connected to a power source such as an electrical outlet. In some embodiments, power socket 1320 may include a power cable (e.g., a retractable power cable) for connection to a power source.

User interface 1350 may include a user input device, a display, or a speaker. Any type of user input device may be included as part of user interface 1350, such as a keyboard, a mouse, a touch screen, buttons, switches, a microphone, a joy stick, a touch pad, or any other suitable input device. Any suitable type of display may be included as part of user interface 1350, such as a cathode ray tube display, a flat panel display such as a liquid crystal display or plasma display, or any other suitable display device. The display may display, for example, menu options and softkeys may be provided to enable a user to control the operation of charging surface 1300. As another example, the display may display one or more indicator lights 1330, indicating the status of each of charging stations 1302A-C. The status may indicate whether a flying machine is docked at a charging station, whether a battery is being charged, charging voltage, charging current, expected charging time, battery identifier, battery health status, whether a battery is fully charged, any other suitable information, or any combination thereof.

User interface 1350 may enable the user to control various aspects of charging surface 1300. For example, a user may use user interface 1350 to initiate charging of flying machines docked in respective charging stations. As another example, a user may use user interface 1350 to retrieve information from docked flying machines. As another example, a user may use user interface 1350 to program or adjust software or settings of flying machines.

External communication interface 1340 may enable charging surface 1300 to communicate with external devices. External communication interface 1340 may include any suitable hardware or hardware and software, which may allow charging surface 1300 to communicate with electronic circuitry, a device (e.g., a laptop or smartphone), a network, a server or other workstations, a display, or any combination thereof. External communication interface 1340 may include one or more receivers, transmitters, transceivers, antennas, plug-in connectors, ports, communications buses, communications protocols, device identification protocols, any other suitable hardware and software, or any combination thereof. External communication interface 1340 may be configured to allow wired communication, wireless communication, or both. In some embodiments, some or all of user interface 1350 may not be included in charging surface 1300 and the functionality may be implemented in an external device that communicates with charging surface 1300 using external communication interface 1340. In some embodiments where multiple charging surfaces are used, a single external device (e.g., a laptop) may be used to control multiple charging surfaces through their respective external communication interfaces. In some embodiments, charging station 1300 does not include external communication interface 1340.

Figure 15:
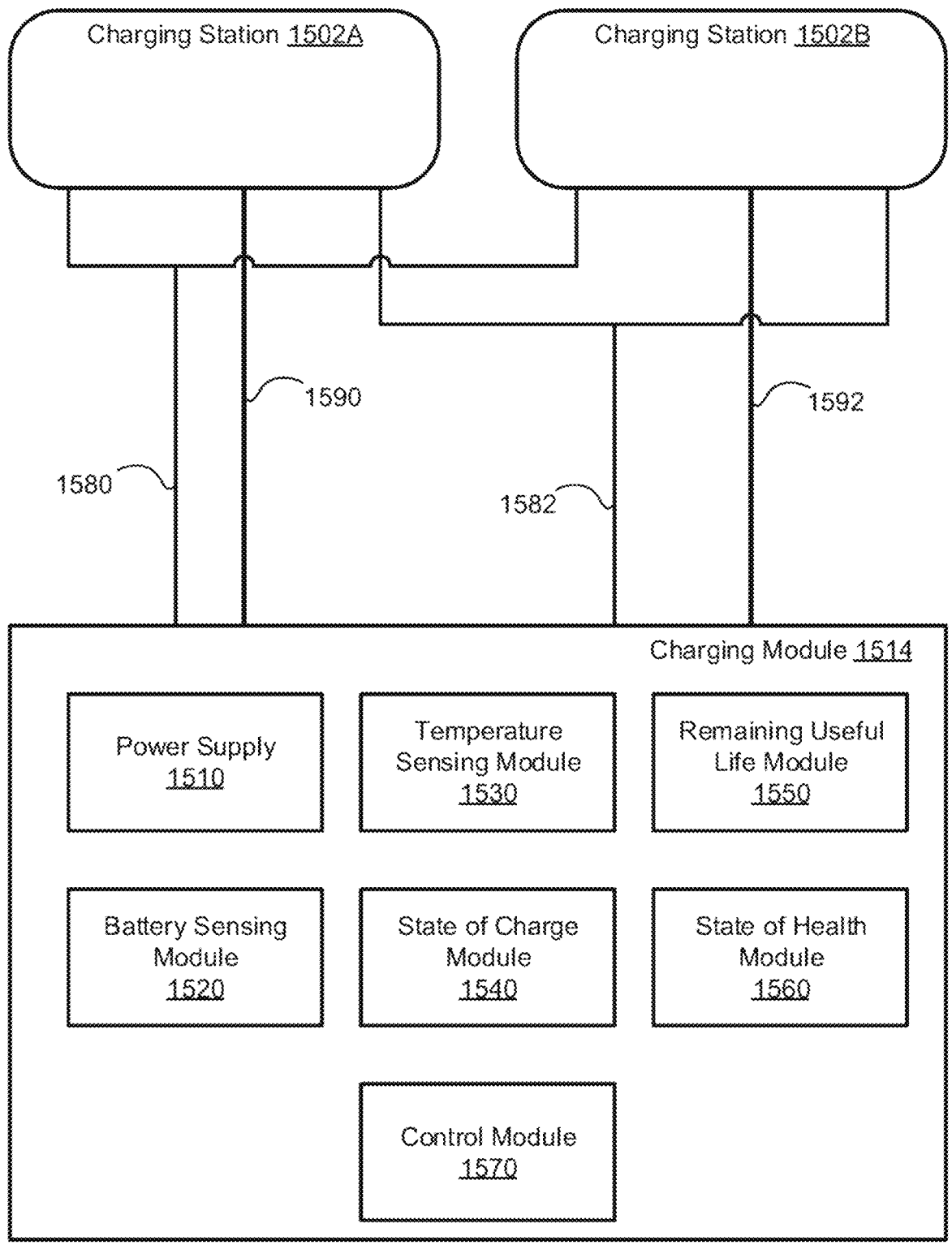
FIG. 15 shows a block diagram of an illustrative charging module and its interconnection with two charging stations, in accordance with some embodiments of the present disclosure.

FIG. 15 shows a block diagram of illustrative charging module 1514 and its interconnection with charging stations 1502A and 1502B in accordance with some embodiments of the present disclosure. In some embodiments, charging module 1514 corresponds to charging module 1314 of FIG. 13 and charging stations 1502A and 1502B correspond to two of the charging stations of FIG. 13. Charging module 1514 is connected to charging station 1502A by connectors 1580, 1582, and 1590. Charging module 1514 is connected to charging station 1502B by connectors 1580, 1582, and 1592. Connector 1580, 1582, 1590, and 1592 may be any suitable wired connections for providing communication between charging module 1514 and charging station 1502A and 1502B.

Charging module 1514 may provide a constant or variable voltage or current to charging stations 1502A and 1502B to charge batteries of docked flying machines using connectors 1580 and 1582 and power supply 1510. While connectors 1580 and 1582 are shown as being connected to multiple charging stations, it will be understood that other configurations can be used. For example, separate connectors can be used for each charging station. As another example, switches can be used in connectors 1580 and 1582 to enable independent control of each charging station. In some embodiments, charging module 1514 uses connectors 1590 and 1592 to monitor and control the charging of docked batteries (e.g., battery balancing). In some embodiments, connectors 1590 and 1592 may each include multiple wired connections.

Charging module 1514 may include battery sensing module 1520, temperature sensing module 1530, state of charge (SOC) module 1540, remaining useful life (RUL) module 1550, state of health (SOH) module 1560, and control module 1570. Battery sensing module 1520 may be configured to detect when a flying machine is docked at a charging station. For example, battery sensing module 1520 may check the resistance, voltage, or current across two connectors of a charging station to detect the presence of a flying machine. In some embodiments, battery sensing module 1520 may be configured to detect the orientation of the flying machine on the charger station (e.g., by performing checks across different combinations of connectors). Temperature sensing module 1530 may be configured to detect the temperature of a docked battery. In some embodiments, temperature sensing module 1530 may be configured to detect multiple temperatures of a docked battery (e.g., one for each battery cell). Temperature sensing module 1530 may determine the temperature of the battery using any suitable technique or combination of techniques. For example, the temperature may be estimated based on the charging history and a model of the temperature behavior of the battery. As another example, the temperature may be determined by measuring the impedance of the battery. As another example, the temperature may be determined using a thermistor. In addition, any other technique or combination of techniques may be used to determine one or more temperatures of a battery.

SOC module 1540 may be configured to determine the available capacity of a battery. In some embodiments, SOC module 1540 may be configured to determine the available capacity of each cell of the battery. The available capacity of the battery may be determined using any suitable technique. Charging module 614 may use the capacity information in order to perform battery balancing.

RUL module 1550 may be configured to determine the remaining useful life. RUL module 1550 may determine the remaining useful life using any suitable technique. For example, the remaining useful life may be determined by monitoring the battery while it is being charged. As another example, the battery or the flying machine may have a unique ID number and RUL module 1550 may use historical charging information to determine the remaining useful life. When the remaining useful life is less than a predetermined amount, charging module 1514 may trigger an alarm or display a warning to an operator.

SOH module 1560 may be configured to determine the general condition of a battery. In some embodiments, the general condition is determined in comparison to a new battery or an ideal condition for that type of battery. For example, SOH module 1560 could measure the impedance of the battery and compare the measurement to the impedance typically achieved by new batteries. As another example, SOH module 1560 could measure the capacity of the battery by performing a full discharge and charge cycle of the battery and compare the measurement to the nominal capacity of the battery. SOH module 1560 may display the condition of the battery for an operator. In some embodiments, the condition of the battery is used by RUL module 1550 to determine the remaining useful life.

Control module 1570 may be configured to determine the appropriate constant or variable voltage or current for charging stations 1502A and 1502B to charge batteries of docked flying machines using connectors 1580 and 1582, and power supply 1510. In addition to charging, control module 1570 may be configured to balance the batteries, or perform special functions such as regulating the battery to a specific SOC (e.g., a SOC suitable for transport or storage). In other embodiments, the control module may be physically located on the flying machine.

It will be understood that while charging module 1514 has been described as including several different modules, not all of the modules need to be included. For example, in a basic implementation, modules 1520-1570 may not be included as part of charging module 1514.

Charging module 1514 may be configured to maximize the useful life of the batteries and charge the batteries in a safe manner. For example, the charging current or voltage may be intelligently ramped up at the start of charging. As another example, a current limiter or surge protection may be used to prevent the batteries from overheating. As another example, fuses may be included as part of the connectors or in the batteries to prevent too much current from entering the battery and protect the batteries from a short circuit. Any other safety techniques and combinations of safety techniques may be included in charging module 1514.

While charging module 1514 has been described as being connected to charging stations 1502A and 1502B, in some embodiments a separate charging module 1514 may be physically located on each flying machine. In such embodiments, each charging station may provide power to the flying machine in order to power the charging module.

It will be understood that while the storage containers described can include charging capability that is sometimes referred to as charging surfaces, in some embodiments the storage containers may not include charging capability.

Figure 16:
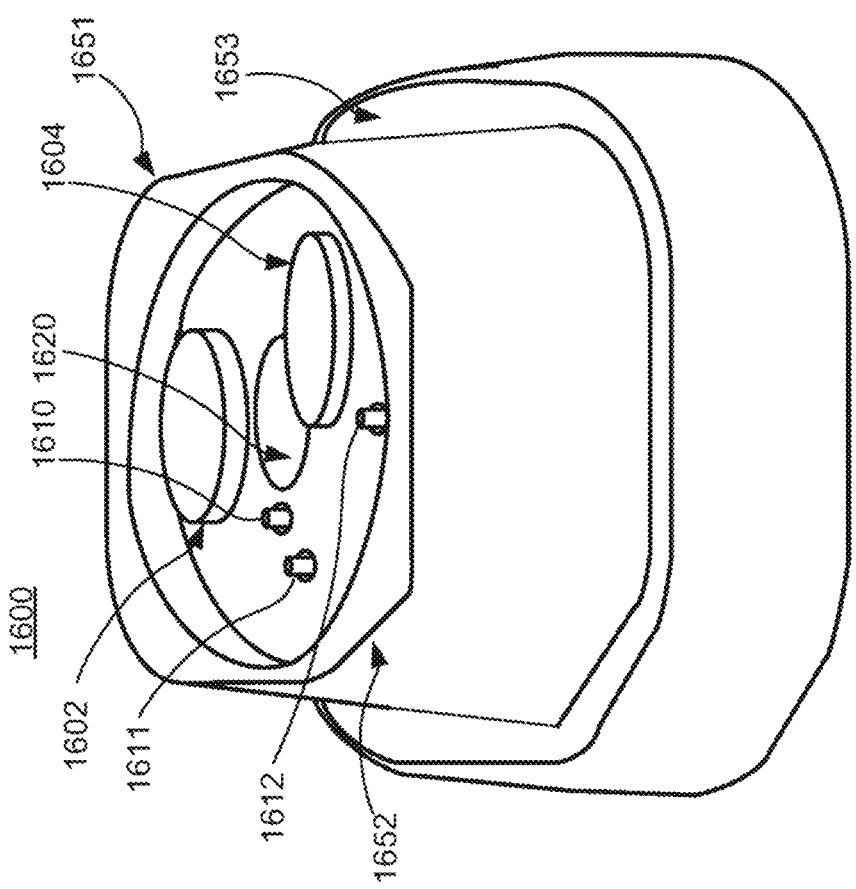
FIG. 16 shows a perspective view from the top of an illustrative charging station, in accordance with some embodiments of the present disclosure.

FIG. 16 shows a perspective view from the top of illustrative charging station 1600, in accordance with some embodiments of the present disclosure. Charging station 1600 includes features 1602 and 1604 for engaging with a docked flying machine. Charging station 1600 also includes electrical terminals 1610-1612 for coupling to corresponding electrical terminals of a docked flying machine. As shown, electrical terminals 1610-1612 comprise compression contacts. It will be understood that electrical terminals 1610-1612 may be any of the electrical connectors described herein. It will also be understood that charging station 1600 may include any suitable number of electrical terminals.

In some embodiments, as shown, charging station 1600 includes feature 1620, which is a recess. Feature 1620 is configured to accommodate a protrusion from the docked flying machine (e.g., a light emitting diode (LED) protruding from the bottom of the flying machine).

Charging station 1600 includes several mechanical keying features configured to facilitate alignment of the tray relative to a plurality of charging stations. For example, mechanical keying feature 1651 is a raised lip that rises about electrical terminals 1610-1612. In some embodiments, each of the plurality of charging stations includes a plurality of electrical contacts and wherein the plurality of mechanical keying features have sufficient height to prevent the tray from contacting the plurality of electrical contacts (e.g., when the tray is misaligned). For example, mechanical keying feature 1651 protects electrical terminals 1610-1612 (or other electrical contacts) from damage. In some embodiments, mechanical keying feature 1651 is configured to pass through a respective passageway in the tray when the tray is properly aligned with respect to the plurality of charging stations. Mechanical keying feature 1652 is a flattened portion of the perimeter of mechanical keying feature 1651. Mechanical keying feature 1652 is configured to ensure that charging station 1600 is orientated correctly to a passageway of a tray (e.g., where the passageway has a corresponding flattened corner allowing a single rotational position of the charging station). Mechanical keying feature 1653 is a step configured for allowing a tray to rest on when installed. Mechanical keying feature 1653 may be configured to hold the tray at a height allowing a flying machine to properly dock.

Figure 17:
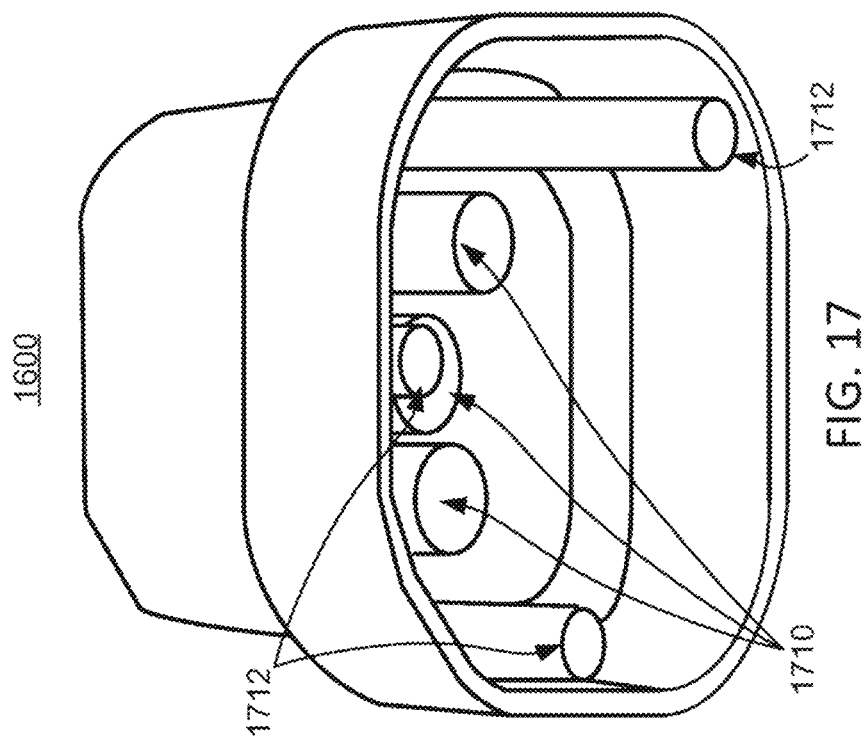
FIG. 17 shows a perspective view from the bottom of the illustrative charging station of FIG. 16, in accordance with some embodiments of the present disclosure.
Figure 18:
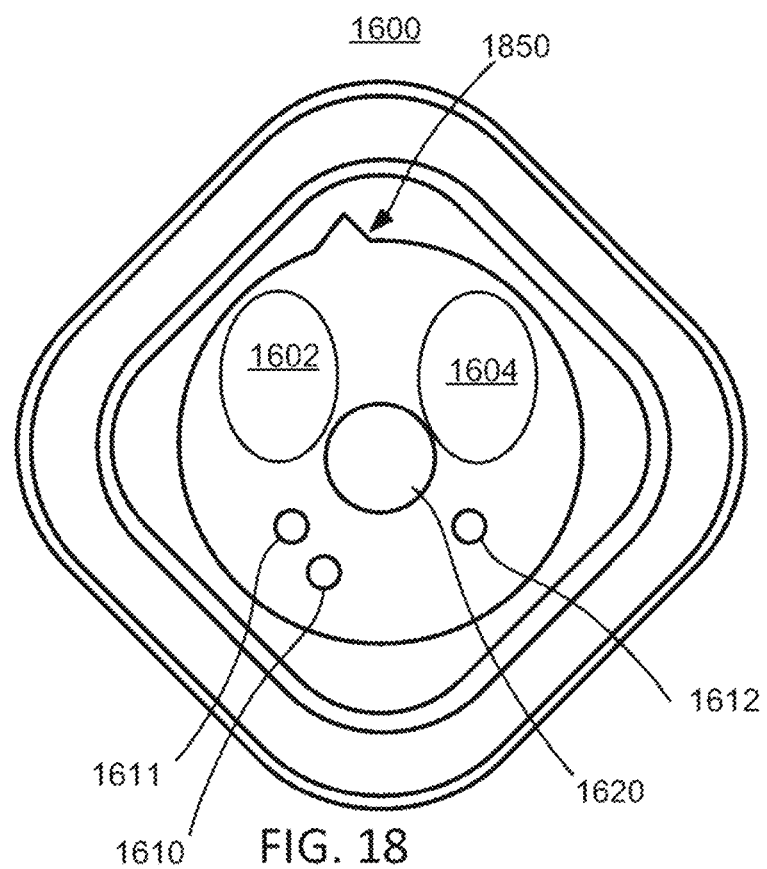
FIG. 18 shows a top view of the illustrative charging station of FIG. 16, in accordance with some embodiments of the present disclosure.

FIG. 17 shows a perspective view from the bottom of illustrative charging station 1600 of FIG. 16, in accordance with some embodiments of the present disclosure. FIG. 18 shows a top view of illustrative charging station 1600 of FIG. 16, in accordance with some embodiments of the present disclosure. Features 1710 of FIG. 17 include respective magnets, configured to generate an attractive magnetic force on corresponding ferrous features of a flying machine. For example, a flying machine may include three assembly bolts, located at corresponding locations to features 1710, such that when docked, charging station 1600 applies an attractive force on the flying machine via the magnets of features 1710. Features 1712 include mounts for mounting charging station 1600 to a drawer, charging surface, or other suitable mounting counterpart. For example, charging station 1600 may be placed on a charging surface, and fasteners may be threaded through the charging surface into features 1712 for securing charging station 1600 in place.

Figure 19:
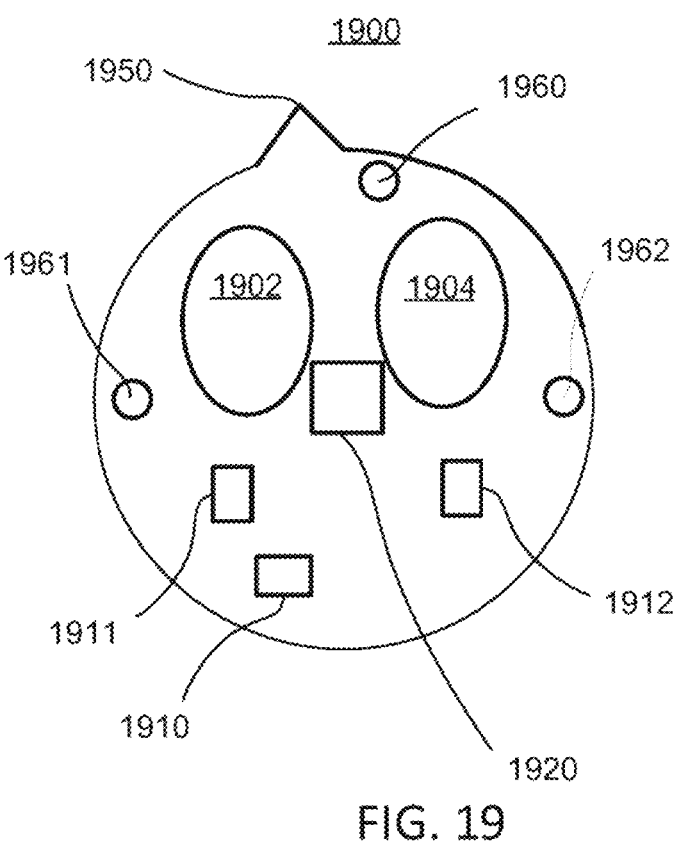
FIG. 19 shows a top view of an illustrative flying machine portion configured to engage with the illustrative charging station of FIG. 16, in accordance with some embodiments of the present disclosure.

FIG. 19 shows a top view of illustrative flying machine portion 1900 configured to engage with illustrative charging station 1600 of FIG. 18, in accordance with some embodiments of the present disclosure. For example, passageways 1902 and 1904 of flying machine portion 1900 are configured to engage with respective features 1602 and 1604 of charging station 1600. LED 1920 is configured to fit in feature 1620 of charging station 1600 when the corresponding flying machine is docked. In some embodiments, flying machine portion 1900 is a printed circuit board mounted to the bottom of the flying machine. Electrical terminals 1910-1912 are configured to electrically couple to corresponding respective electrical terminals 1610-1612 of docking station 1600. It will be understood that while LED 1920 and electrical terminals 1910-1912 are depicted on the top surface of flying machine portion 1900, these elements can be positioned on the bottom surface. In some embodiments, passageways 1902 and 1904 are open to the periphery of flying machine portion 1900 (e.g., they are not closed shapes).

Protrusion 1950 of flying machine portion 1900 is configured to align with recess 1850 of FIG. 18 when the corresponding flying machine is docked to charging station 1600. Protrusion 1950 and recess 1850 may include any suitable shape. Accordingly, protrusion 1950 acts as a mechanical keying feature for the flying machine to charging station engagement. For example, flying machine portion 1900 only fits in one orientation to charging station 1600, based at least in part on protrusion 1950 and corresponding recess 1850. In some embodiments, features 1960-1962 of flying machine portion 1900 are configured to, for example, accommodate fasteners for mounting flying machine portion 1900 to the corresponding flying machine. Accordingly, if steel fasteners are used, for example, then magnets of features 1710 of FIG. 17 may apply an attractive magnetic force to respective fasteners, and thus the flying machine, aiding in docking of the flying machine to charging station 1600. In some embodiments, one of features 1960-1962 is located on protrusion 1950.

FIG. 20 shows a perspective view from the top of illustrative flying machine 2002 and illustrative charging station 1600 of FIG. 16, in accordance with some embodiments of the present disclosure. Flying machine 2002 is configured to dock to charging station 1600. It will be understood that charging station 1600 may be used on any of the charging surfaces described herein. In addition, flying machine 2002 may be used separately or in combination with any of the trays described herein. In some embodiments, flying machine 2002 docks with charging station 1600 after being lowered onto the charging station via a tray (e.g., tray 102 of FIG. 1).

It will be understood that the trays disclosed herein may be made of any suitable material or materials. For example, the trays may be made from wood (e.g., plywood) or a polymer (e.g., a carbon fiber reinforced polymer). It will also be understood that the shape and passageways of the tray may be made using any suitable manufacturing technique. For example, the tray may be manufactured by processing (e.g., milling) a larger source material. As another example, the tray may be manufactured using injection molding techniques. It will also be understood that while the tray is generally depicted as being flat, the tray may have any suitable shapes and contours. For example, the tray may include a lip along the perimeter. As another example, the handles may be raised relative to the rest of the tray. As another example, the docking areas may each comprises a concave depression that acts as a self-locating feature to assist in aligning a flying machine in the docking area.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A flying machine charging apparatus, comprising:
a tray comprising a plurality of docking areas arranged on a top surface of the tray in a spatial pattern, wherein:
each of the plurality of docking areas is configured to receive a respective one of a plurality of flying machines; and
each of the plurality of docking areas comprises:
at least one mechanical feature fixedly attached to the tray and configured to interact with a corresponding portion of a flying machine to maintain the flying machine in the docking area; and
at least one passageway between the top surface of the tray and an opposite bottom surface of the tray; and
a plurality of charging stations arranged in the spatial pattern, wherein:
when the plurality of flying machines are positioned on the plurality of docking areas on the top surface of the tray and when the bottom surface of the tray is positioned adjacent to the plurality of charging stations such that the spatial patterns of the plurality of docking areas and the plurality of the charging stations are aligned, contact is made between each of the plurality of charging stations and a corresponding one of the plurality of flying machines through a respective at least one passageway.

2. The apparatus of claim 1, wherein each charging station of the plurality of charging stations comprises at least one protrusion, wherein when the bottom surface of the tray is moved towards the plurality of docking areas:
the at least one protrusion of each of the plurality of charging stations passes through the at least one passageway of a respective one of the plurality of docking areas; and
the contact is made between each of the at least one protrusion of the plurality of charging stations and the corresponding one of the plurality of flying machines.

3. The apparatus of claim 2, wherein when the bottom surface of the tray is moved towards the plurality of docking areas, each of the at least one protrusion lifts the corresponding one of the plurality of flying machines off of the top surface of the tray.

4. The apparatus of claim 2, wherein the contact is made using a compression contact or a swipe contact and wherein when the bottom surface of the tray is positioned adjacent to the plurality of charging stations, the plurality of flying machines are at least partly supported by the tray.

5. The apparatus of claim 1, wherein each charging station of the plurality of charging stations comprises at least one magnet configured to apply a force on at least one ferromagnetic component of a corresponding one of the plurality of flying machines to align or couple the flying machine to the charging station.

6. The apparatus of claim 1, wherein each charging station of the plurality of charging stations comprises an inductive charging element.

7. The apparatus of claim 1, wherein each of the plurality of docking areas further comprises an alignment indicator to facilitate placement of each of the plurality of flying machines on a respective docking area.

8. The apparatus of claim 1, wherein the at least one mechanical feature of each of the plurality of docking areas comprises at least three depressions configured to receive corresponding feet of a respective one of the plurality of flying machines.

9. The apparatus of claim 8, wherein for each of the plurality of docking areas, a first depression of the at least three depressions is shaped differently than a second depression of the at least three depressions, and wherein the shapes of the at least three depressions restrict the orientation of a flying machine to a single orientation for placement on the docking area.

10. The apparatus of claim 8, wherein:
the at least one passageway of each docking area comprises at least two passageways;
each of the at least two passageways of each docking area is located in a different one of the at least three depressions; and
when the plurality of flying machines are positioned on the plurality of docking areas on the top surface of the tray and when the bottom surface of the tray is positioned adjacent to the plurality of docking areas such that the spatial patterns of the plurality of docking areas and the plurality of the charging stations are aligned, contact is made between each of the plurality of charging stations and a corresponding one of the plurality of flying machines through each of the respective at least two passageways.

11. The apparatus of claim 1, further comprising a plurality of mechanical keying features configured to facilitate alignment of the tray relative to the plurality of charging stations.

12. The apparatus of claim 11, wherein each of the plurality of charging stations comprises a plurality of electrical contacts and wherein the plurality of mechanical keying features have sufficient height to prevent the tray from contacting the plurality of electrical contacts for each of the charging stations when the tray is misaligned.

13. The apparatus of claim 12, wherein each of the plurality of mechanical keying features is configured to pass through a respective passageway through the tray when the tray is properly aligned with respect to the plurality of charging stations.

14. The apparatus of claim 1, wherein each of the at least one passageway is located in the center of the corresponding docking area.

15. The apparatus of claim 1, wherein each charging station of the plurality of charging stations comprises at least two terminals that are configured for making contact with corresponding terminals of a flying machine and wherein the at least two terminals are configured to provide power to the flying machine and data communication with the flying machine.

16. The apparatus of claim 1, further comprising a wireless data communication interface configured to provide wireless data communication with the plurality of flying machines.

17. The apparatus of claim 1, wherein each charging station of the plurality of charging stations comprises a wireless communication interface configured to provide wireless data communications with a corresponding one of the plurality of flying machines.

18. The apparatus of claim 1, wherein the spatial pattern comprises at least three docking areas arranged in a pattern.

19. The apparatus of claim 1, wherein the spatial pattern comprises at least two rows and at least two columns.

20. The apparatus of claim 1, wherein the tray further comprises at least one handle on a side of the tray that can be used to lift the tray.

21. The apparatus of claim 1, further comprising an additional plurality of charging stations, wherein:
the spatial pattern of the plurality of charging stations extends to the additional plurality of charging stations;
the plurality of charging stations and the additional plurality of charging stations comprise a total number of charging stations; and
multiple trays are capable of being positioned adjacent to different subsets of the total number of charging stations at the same time.

22. The apparatus of claim 1, further comprising a plurality of indicator lights configured to indicate a status of each of the plurality of flying machines when the plurality of flying machines are coupled to the plurality of charging stations.

23. The apparatus of claim 22, wherein the status of each of the plurality of flying machines comprises one or more charge status, connectivity status, maintenance status, and correct tray status.

24. The apparatus of claim 22, wherein each indicator light of the plurality of indicator lights is configured to turn a first color when a corresponding one of the plurality of flying machines is charging and second color when the corresponding one of the plurality of flying machines is fully charged.

25. The apparatus of claim 22, wherein each indicator light of the plurality of indicator lights is configured to be off when a corresponding one of the plurality of flying machines is not connected to a network and turn a first color when the corresponding one of the plurality of flying machines is connected to the network.

26. The apparatus of claim 1, further comprising a set of indicator lights coupled to the first plurality of charging stations, wherein the set of indicator lights comprises:
a first plurality of indicator lights configured to indicate a level of charge of each of the plurality of flying machines when the plurality of flying machines are coupled to the plurality of charging stations; and
a second plurality of indicator lights configured to indicate a connectivity status of each of the plurality of flying machines to a network when the plurality of flying machines are coupled to the plurality of charging stations.

27. The apparatus of claim 1, further comprising a protective layer configured to be positioned above or below the plurality of flying machines when the plurality of flying machines are positioned on the plurality of docking areas.

28. The apparatus of claim 1, further comprising a bottom protective layer and a top protective layer, wherein the bottom protective layer is configured to be positioned between the tray and the plurality of flying machines and the top protective layer is configured to be positioned over the bottom protective layer when the plurality of flying machines are positioned on the plurality of docking areas to protect each of the plurality of flying machines in a void between the bottom protective layer and the top protective layer.

29. The apparatus of claim 1, further comprising:
a protective layer configured to protect the plurality of flying machines when the plurality of flying machines are positioned on the plurality of docking areas; and
a storage mechanism configured to store the protective layer when the protected layer is not in use.

30. The apparatus of claim 1, wherein each of the plurality of docking areas comprises at least one guide structure configured to assist in launching a corresponding flying machine from the docking area without interfering with adjacent flying machines.

31. The apparatus of claim 1, wherein each of the plurality of docking areas comprises a self-locating feature configured to assist in aligning a corresponding flying machine with the at least one mechanical feature of the docking area.

32. The apparatus of claim 1, wherein:
the at least one mechanical feature of each of the plurality of docking areas is configured to interact with the corresponding portion of the flying machine to maintain the flying machine in a particular position in the docking area;
the at least one mechanical feature of each of the plurality of docking areas is configured to maintain the flying machine in any orientation; and
the plurality of charging stations are each configured to charge a corresponding flying machine maintained in the particular position in any orientation.

33. The apparatus of claim 1, wherein:
the at least one mechanical feature of each of the plurality of docking areas is configured to interact with the corresponding portion of the flying machine to maintain the flying machine in any one of a discrete number of orientations less than ten; and
the plurality of charging stations are each configured to charge a corresponding flying machine maintained in any one of the discrete number of orientations.

34. The apparatus of claim 1, further comprising a retractable drawer that comprises the plurality of charging stations.

35. The apparatus of claim 34, further comprising a storage container that comprises the retractable drawer and an additional retractable drawer that comprises a plurality of charging stations.

36. The apparatus of claim 1, further comprising a storage container that comprises the plurality of charging stations, wherein the storage container comprises:
an inner frame;
an outer frame; and
at least one shock absorber between the inner frame and the outer frame.

37. The apparatus of claim 36, wherein the tray is mounted to the inner frame.

38. A method of charging a plurality of flying machines, the method comprising:
placing a plurality of flying machines on a plurality of docking areas of a tray that is positioned at a first location, wherein the plurality of docking areas are arranged on a top surface of the tray in a spatial pattern;
lifting the tray with the plurality of flying machines from the first location;
placing the tray with the plurality of flying machines at a second location adjacent to a plurality of charging stations arranged in the spatial pattern, thereby coupling the plurality of charging stations to the plurality of flying machines, wherein the spatial patterns of the plurality of docking areas and the plurality of charging stations are aligned when the tray is at the second location; and charging the plurality of flying machines using the plurality of charging stations while the tray is at the second location.

39. The method of claim 38, further comprising:
lifting the tray with the plurality of flying machines from the second location, thereby decoupling the plurality of the charging stations from the plurality of flying machines;
placing the tray at a third location; and
launching at least one of the plurality of flying machines from the tray while the tray is positioned at the third location.

40. A charging station for a flying machine, comprising:
a first recess configured to receive a surface portion of the flying machine;
a second recess within the first recess configured to receive a fixed protrusion from the surface portion of the flying machine;
at least one locator feature protruding from the first recess;
at least one magnet arranged under the first recess; and
at least two electrical terminals that extend above the first recess.

41. The charging station of claim 40, wherein the fixed protrusion is a light source.

42. The charging station of claim 40, further comprising an electrical connector configured to receive AC power from a power source.

43. The charging station of claim 40, wherein the at least two electrical terminals are configured to provide DC charging.

44. The charging station of claim 40, wherein:
the at least two electrical terminals comprise at least three electrical terminals;
two of the at least three electrical terminals are configured to provide DC charging; and
at least one of the at least three electrical terminals is configured to provide communication with the flying machine.

* * * * *